United States Patent
Aftanas et al.

(10) Patent No.: US 9,855,877 B2
(45) Date of Patent: Jan. 2, 2018

(54) COMBINATION STEP RAIL ASSEMBLY FOR USE AS A STEP PLATFORM OR A RAMP ON A VEHICLE

(71) Applicant: JAC Products, Inc., Saline, MI (US)

(72) Inventors: Jeffrey M. Aftanas, Ortonville, MI (US); Gerard J. Kmita, Allen Park, MI (US)

(73) Assignee: JAC Products, Inc., Saline, MI (US)

(*) Notice: Subject to any disclaimer, the term of this patent is extended or adjusted under 35 U.S.C. 154(b) by 41 days.

(21) Appl. No.: 15/061,004

(22) Filed: Mar. 4, 2016

(65) Prior Publication Data
US 2016/0185273 A1   Jun. 30, 2016

Related U.S. Application Data

(63) Continuation-in-part of application No. 14/568,992, filed on Dec. 12, 2014, now abandoned.

(60) Provisional application No. 61/919,314, filed on Dec. 20, 2013.

(51) Int. Cl.
*B60R 3/00* (2006.01)
*B60P 1/43* (2006.01)
*B65G 69/30* (2006.01)

(52) U.S. Cl.
CPC .............. *B60P 1/433* (2013.01); *B60R 3/007* (2013.01); *B65G 69/30* (2013.01)

(58) Field of Classification Search
CPC .. B60R 9/02; B60R 3/00; B60R 3/002; B60R 3/007; B60R 2011/0042; B60R 2011/008; B60R 2011/0082; B60G 69/30; B60P 1/433; B60P 1/435
See application file for complete search history.

(56) References Cited

U.S. PATENT DOCUMENTS

| | | | |
|---|---|---|---|
| 1,310,973 | A | 7/1919 | Schrenk |
| 5,286,049 | A | 2/1994 | Khan |
| 6,267,398 | B1 | 7/2001 | Lombard |
| 6,520,523 | B2 | 2/2003 | Beck |
| 6,592,135 | B2 | 7/2003 | Hendrix |
| D521,439 | S | 5/2006 | Chapman et al. |
| 7,083,179 | B2 | 8/2006 | Chapman et al. |
| 7,488,025 | B1 | 2/2009 | Roberson |

(Continued)

FOREIGN PATENT DOCUMENTS

JP           08175270  A  *  7/1996  ............ B60R 3/002

*Primary Examiner* — James A Shriver, II
*Assistant Examiner* — Steve Clemmons
(74) *Attorney, Agent, or Firm* — Harness, Dickey & Pierce, P.L.C.

(57) ABSTRACT

The present disclosure relates to a system readily configurable for use as either a step rail along a side of a motor vehicle, or also as a loading ramp for use in loading and unloading cargo to and from a cargo bed of the motor vehicle. The system makes use of a ramp assembly and a plurality of hangers. The hangers each have a first end which is affixed to a portion of the vehicle, and a second end on which the ramp assembly may releasably be supported from and secured to, and thus used as a step rail. The ramp assembly has at least one latching mechanism that can be secured to a striker post on one of the hangers, and a release element. The release element allows the ramp assembly to be detached from the striker post and used as a loading ramp.

19 Claims, 20 Drawing Sheets

(56) References Cited

U.S. PATENT DOCUMENTS

| | | | |
|---|---|---|---|
| 7,621,546 B2 * | 11/2009 | Ross | B60R 3/002 |
| | | | 280/163 |
| 7,637,518 B2 | 12/2009 | Adair | |
| 7,708,294 B2 | 5/2010 | Demick | |
| 7,717,445 B2 | 5/2010 | Peterson et al. | |
| 7,827,641 B2 * | 11/2010 | Hoffman | B65G 69/30 |
| | | | 14/69.5 |
| 8,016,309 B2 | 9/2011 | Flajnik et al. | |
| 8,707,495 B2 * | 4/2014 | Romanak | B60P 1/43 |
| | | | 14/69.5 |
| 9,333,919 B2 * | 5/2016 | Crandall | B60Q 1/323 |
| 2004/0256832 A1 | 12/2004 | Bradsen et al. | |
| 2009/0044729 A1 | 2/2009 | Navarre et al. | |

* cited by examiner

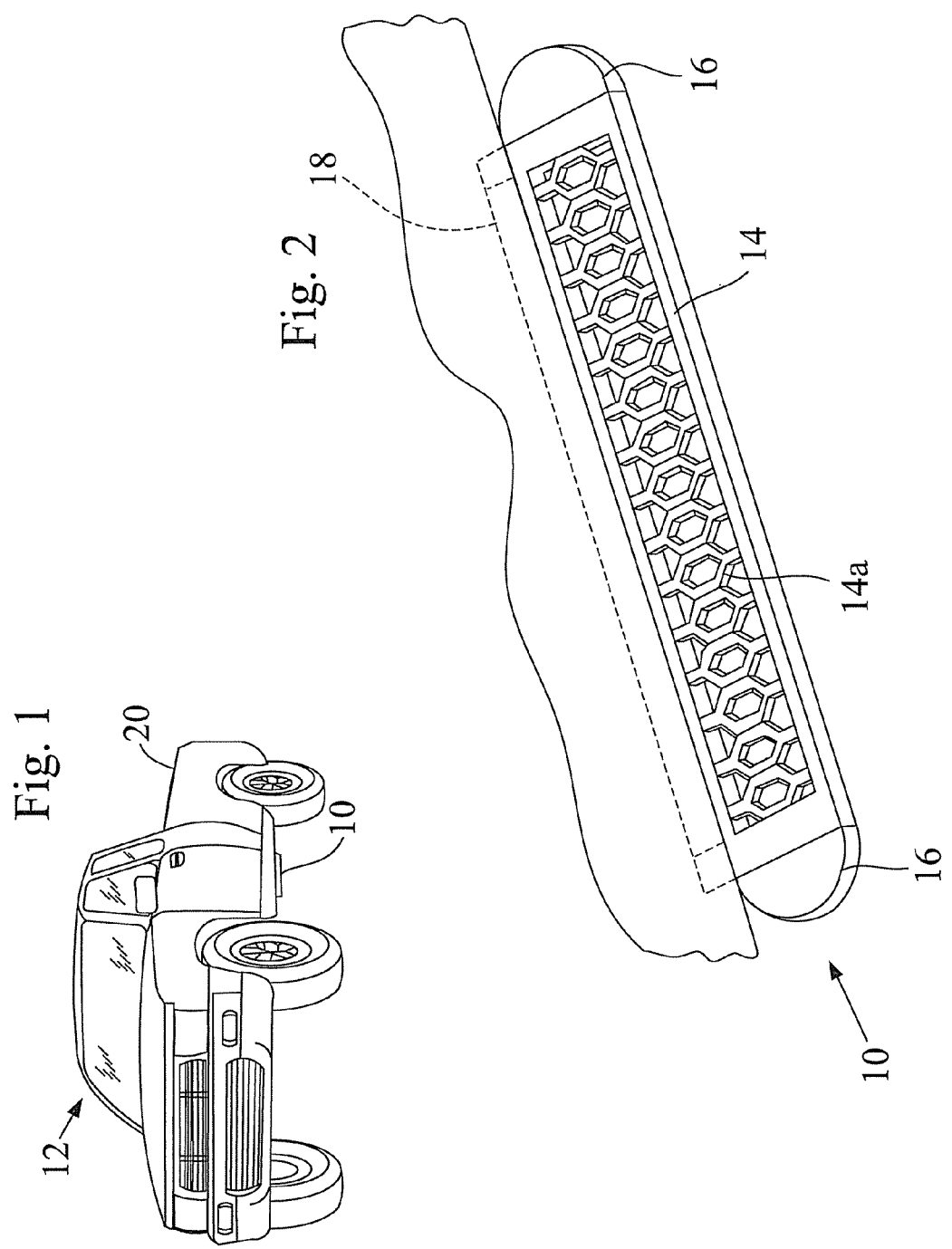

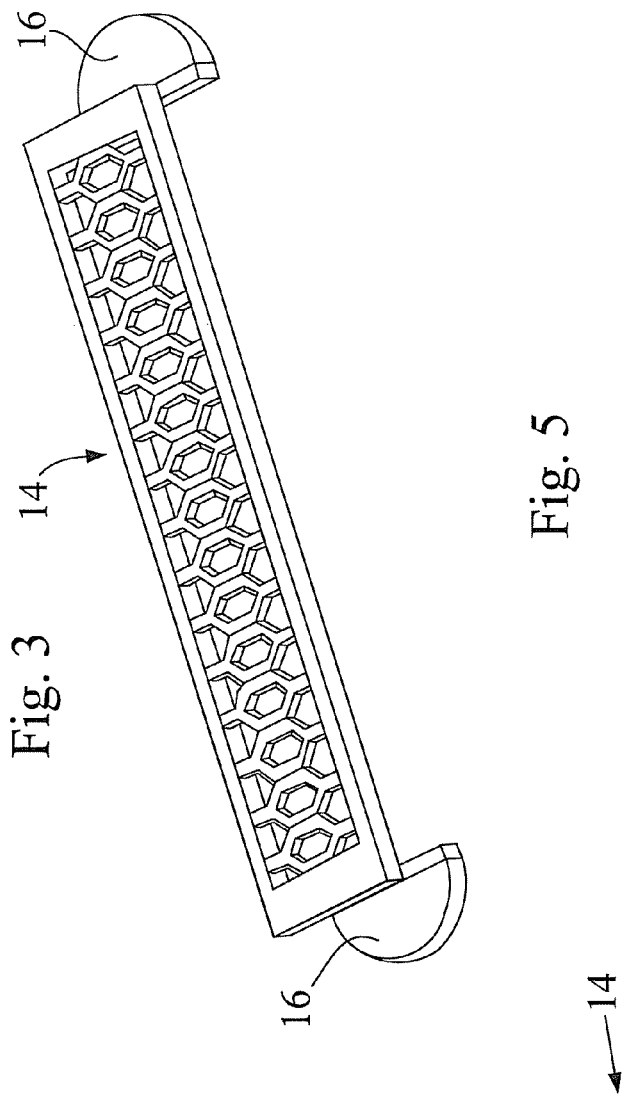
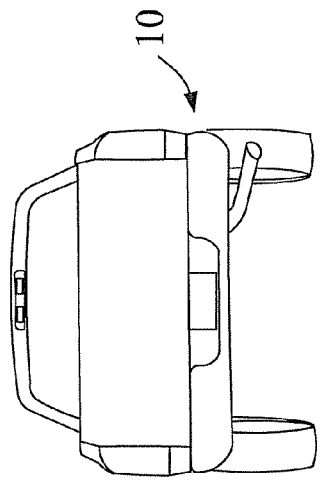
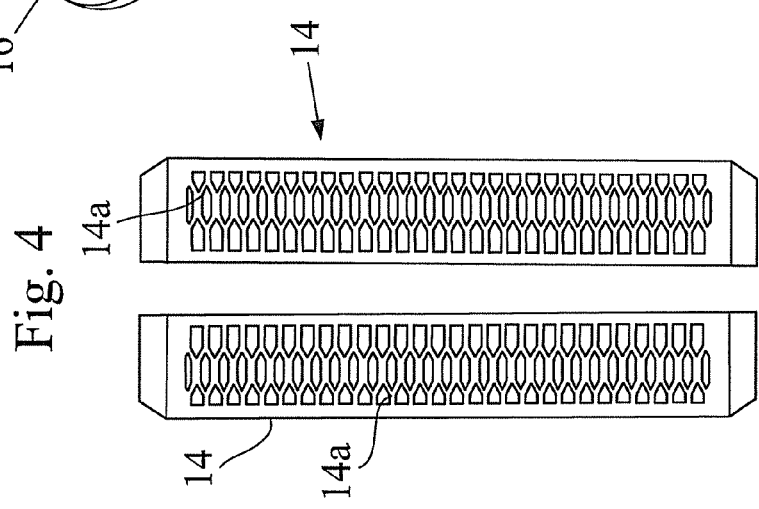

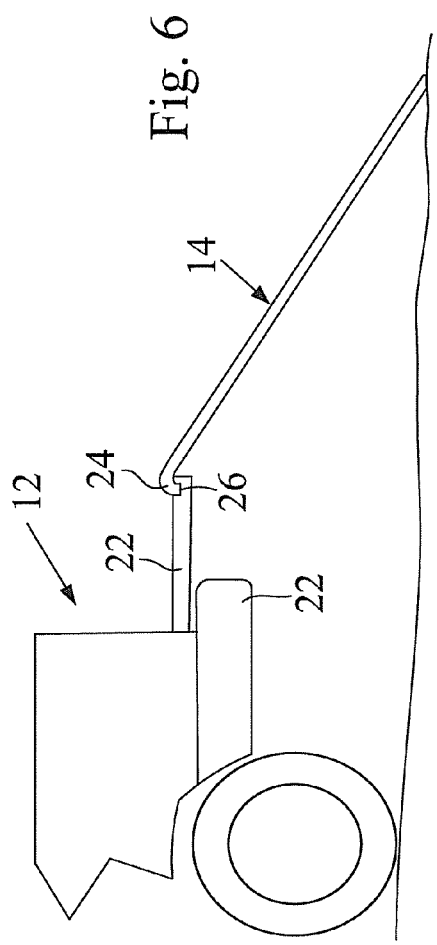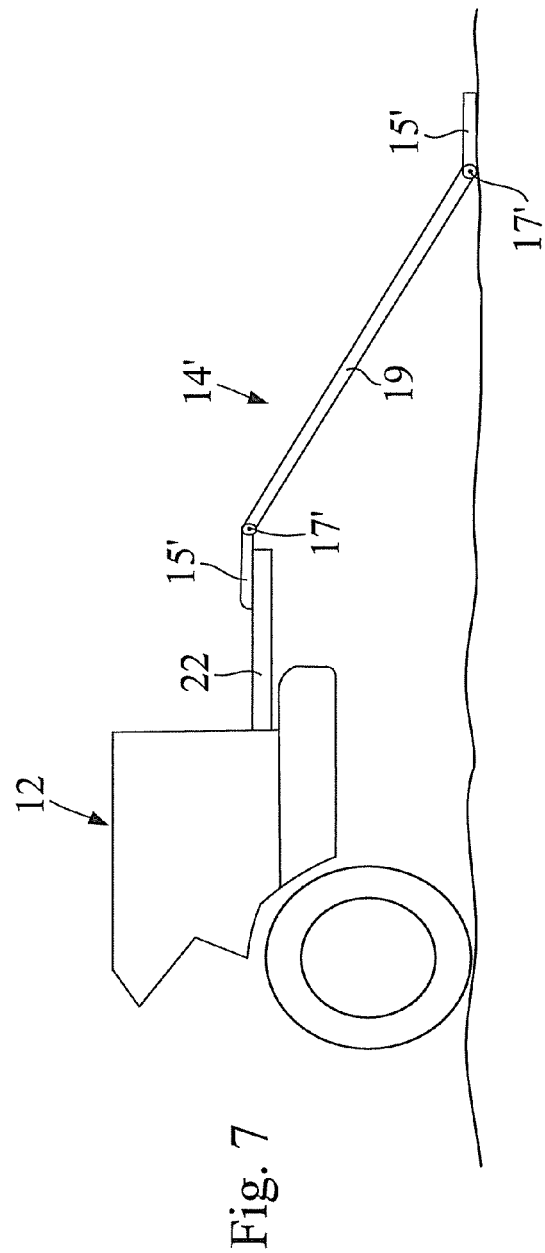

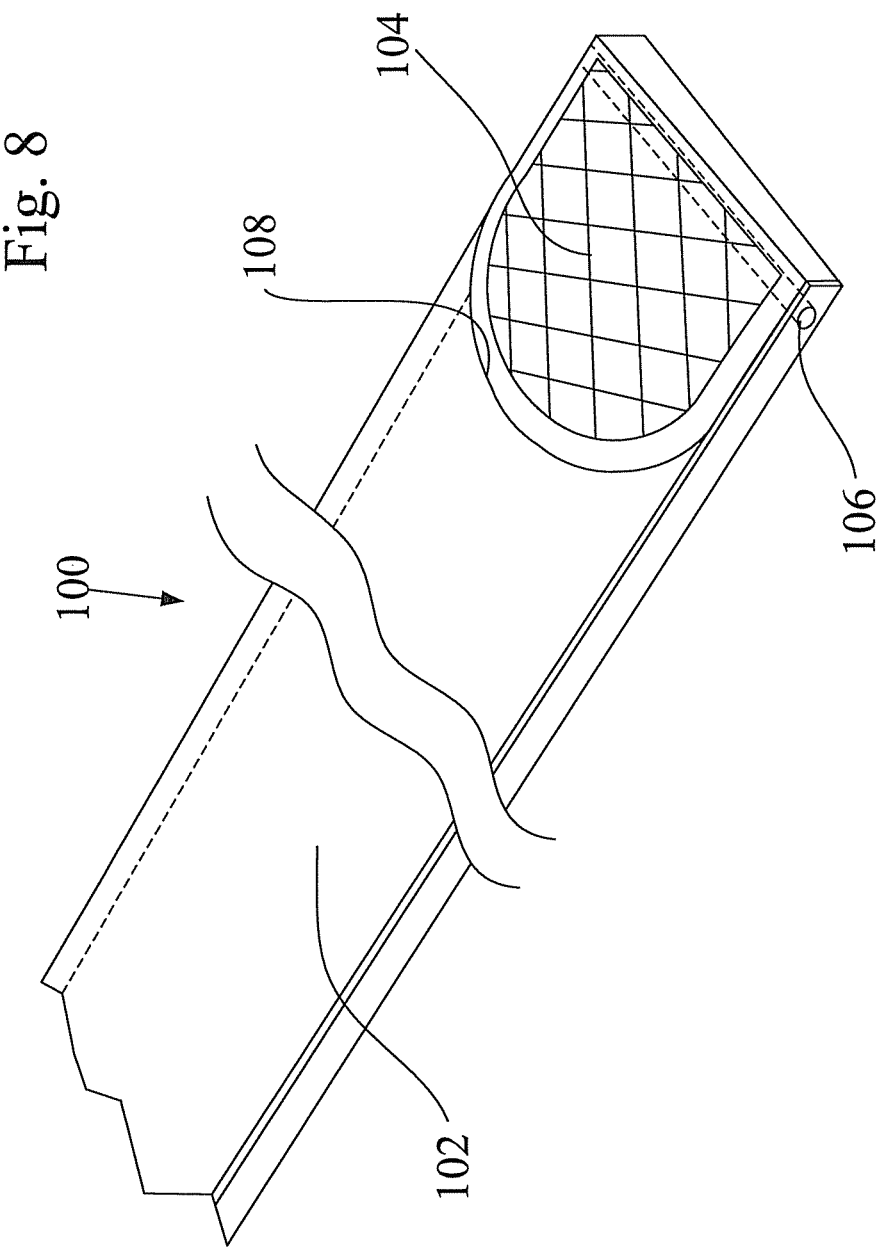

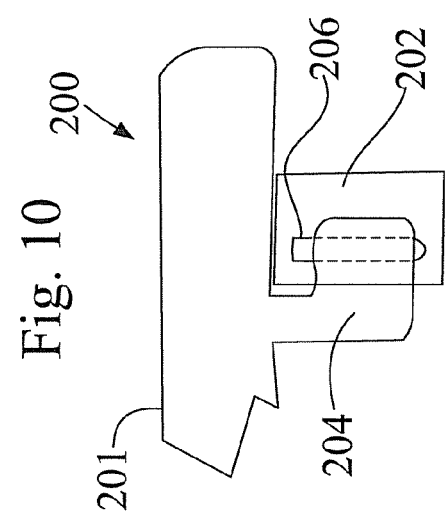
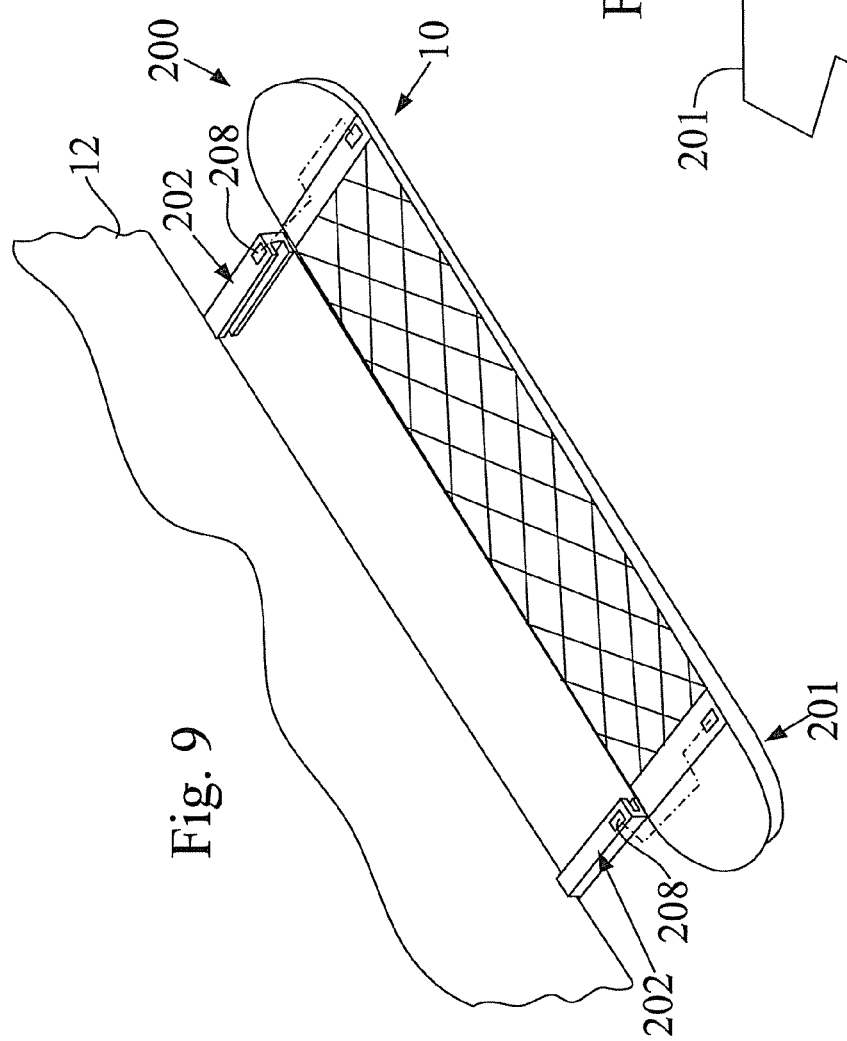

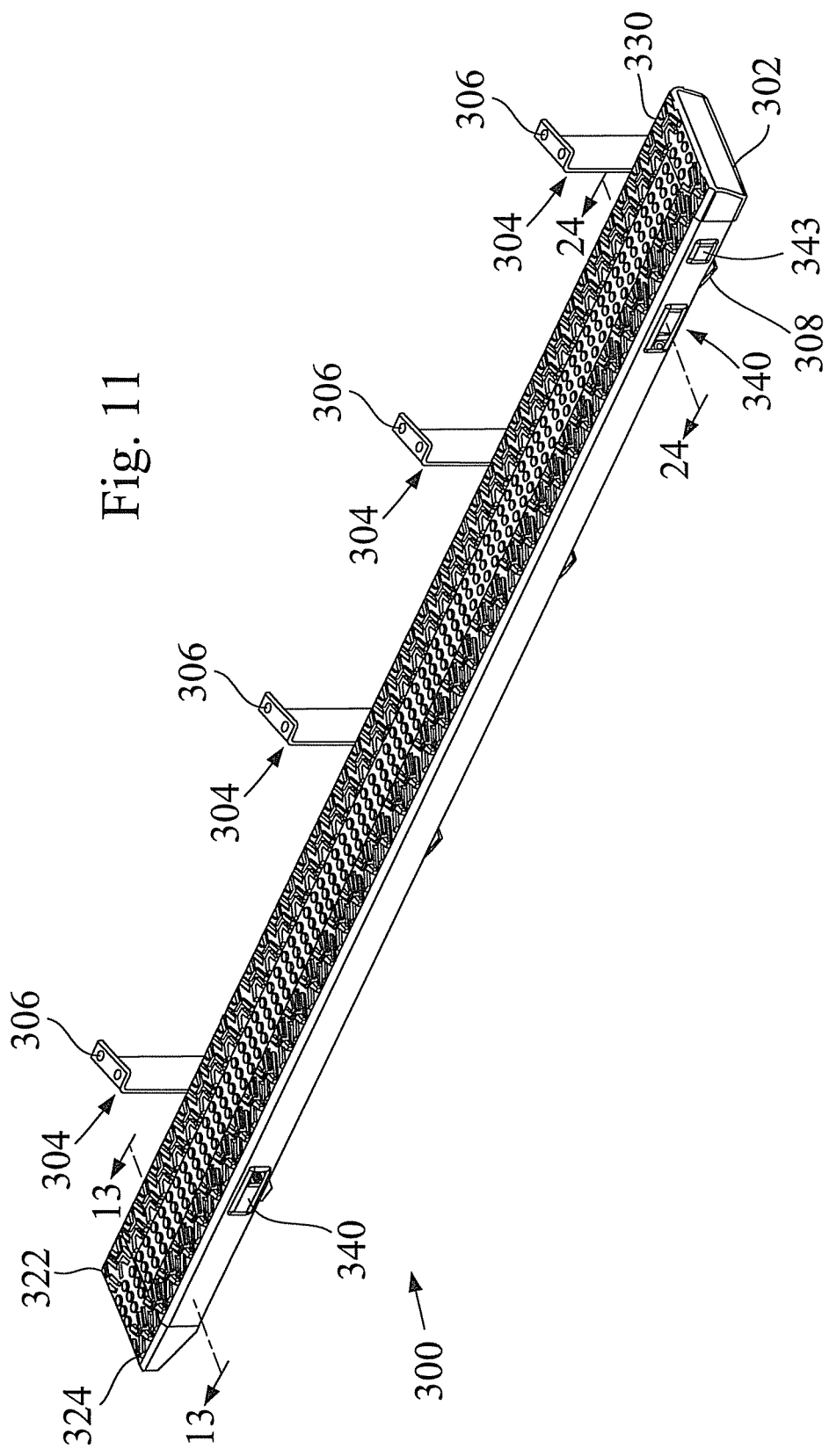

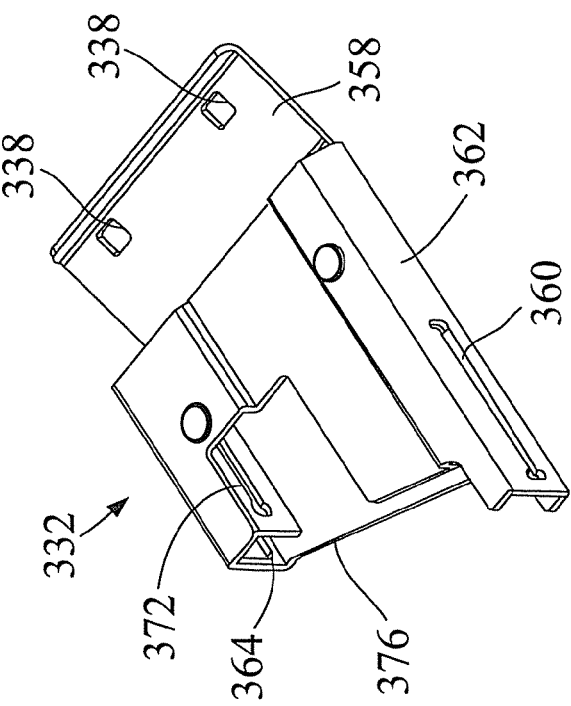
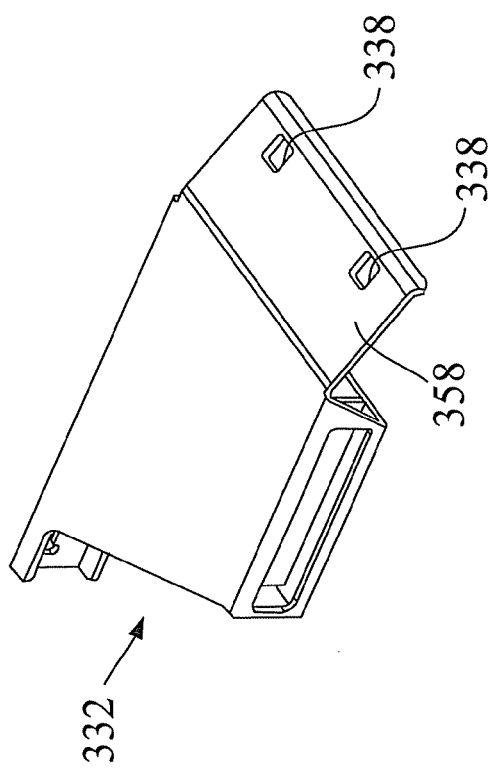

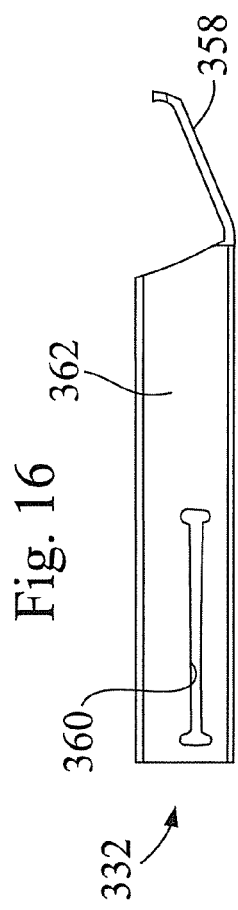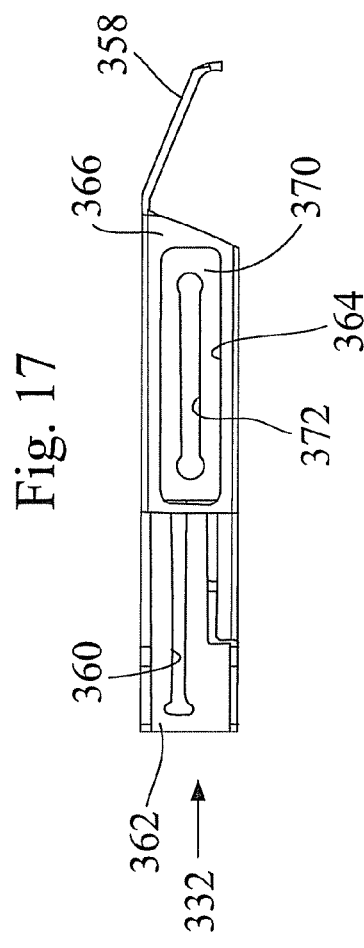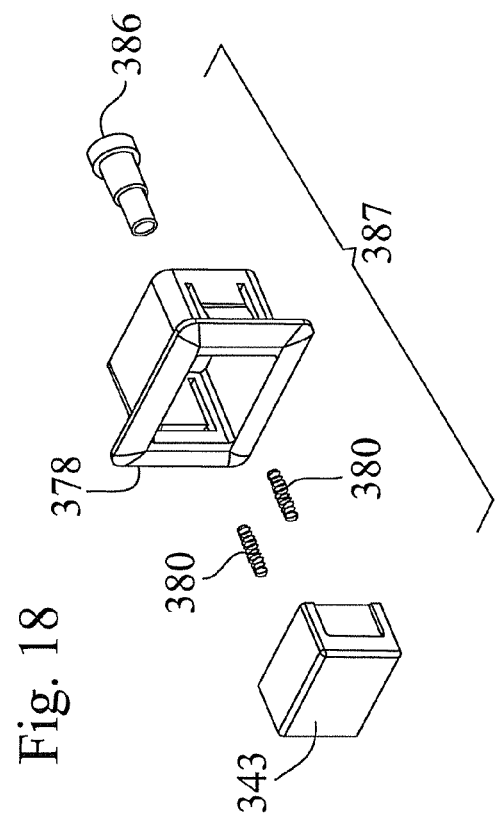

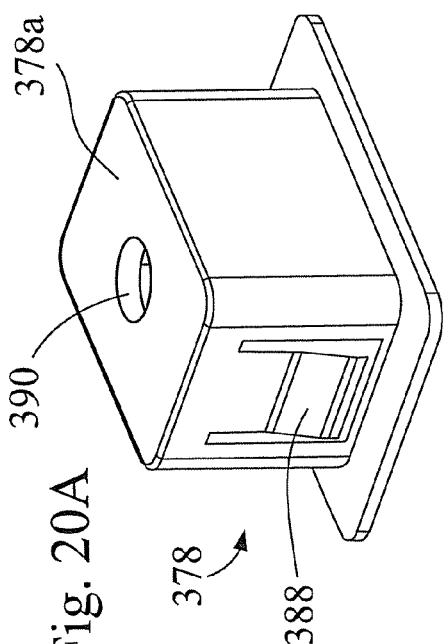
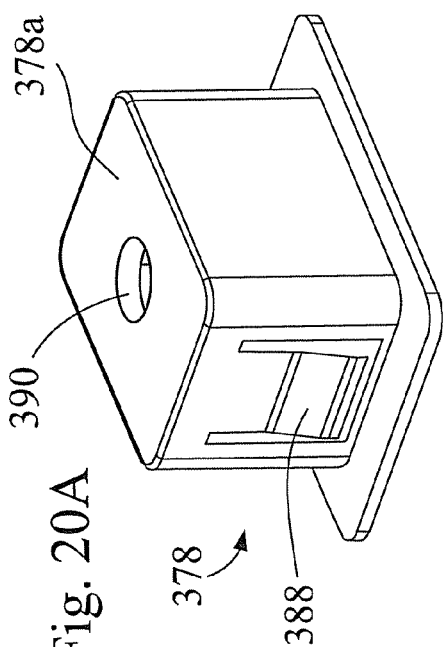
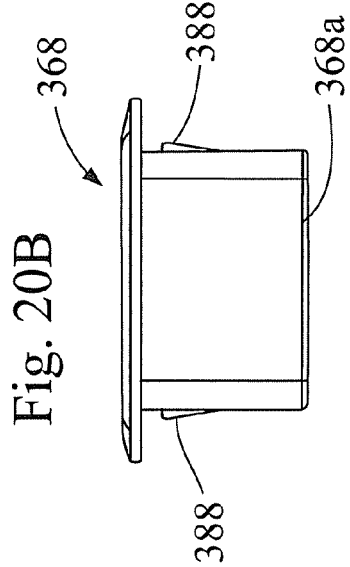
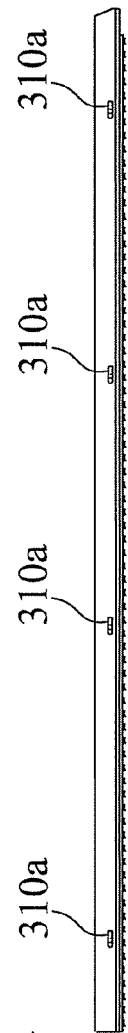
Fig. 19
Fig. 20A
Fig. 20B
Fig. 21

COMBINATION STEP RAIL ASSEMBLY FOR USE AS A STEP PLATFORM OR A RAMP ON A VEHICLE

CROSS-REFERENCE TO RELATED APPLICATIONS

This application is a continuation-in-part of U.S. application Ser. No. 14/568,992, filed Dec. 12, 2014; which claims the benefit of U.S. Provisional Application No. 61/919,314, filed on Dec. 20, 2013. The entire disclosure of the above applications is hereby incorporated by reference into the present disclosure.

FIELD

The present disclosure relates to ramps that are used to help load small vehicles into the bed of a pickup truck, and more particularly to a stowable ramp system that enables a pair of ramps to be stowed on the vehicle and used as step rails on opposing sides of the vehicle, as well as ramps to aid loading and unloading of cargo items to/from the bed of a vehicle.

BACKGROUND

The statements in this section merely provide background information related to the present disclosure and may not constitute prior art.

The popularity of pickup trucks is presently rising, in part because of the high degree of utility that pickup trucks provide to individuals in transporting a wide variety of cargo. One particular type of cargo that individuals often transport in the bed of a pickup truck is all terrain vehicles (ATVs). Another is off road motorcycles (i.e., dirt bikes) as well as everyday motorcycles. Riding lawn mowers, bicycles and other wheeled vehicles often also transported in the bed of a pickup truck.

At the present time conventional lightweight ramps, typically made from aluminum, are usually used to help load such wheeled vehicles into an out from the bed of a pickup truck. While using ramps can be a satisfactory means for loading and unloading wheeled vehicles, storage of the ramps on the vehicle presents some significant drawbacks. Perhaps the biggest drawback is that storage of the ramps in the bed of the pickup truck takes up valuable space. As a result, there is less space in the bed available for use in the bed when the ramps are not needed and are being stowed. There is also no quick and convenient way to secure the ramps in the bed. Typically bungee cords or other like implements are used by an individual to secure the ramps in the bed. And if a bungee cord or other like implement is not available, then the user may be forced to simply let the ramps rest on the floor of the bed. This may result in shifting or bouncing of the ramps in the bed if the vehicle must be driven off road or on uneven road surfaces. Having the ramps bouncing and shifting around in the bed can be unsettling to the driver, as well as noisy. Movement of the ramps in the bed might potentially damage other cargo being carried in the bed.

Still further, with no convenient place to store the ramps on a pickup truck, there is an increased chance that the user may not have the ramps with him/her if (or when) the need arises for their use. Accordingly, it would be highly desirable to have a system in which the ramps are stowed on the vehicle when not needed for use, but which does not take up valuable space in the bed of the pickup truck. It would also be highly desirable if the ramps could operate as step rails for the vehicle when placed in their stowed positions. Such a system would ideally not involve any extensive disassembly or removal procedures to remove the ramps from their stowed positions and place them in an operative position. Still further, such a system would allow the ramps to be stowed after use without complicated securing procedures and external tools being required. Still further, such a system would ideally add little or no appreciable weight to the pickup truck itself, detract from its aerodynamics or otherwise significantly complicate the construction/design of the bed or any other area of the vehicle.

SUMMARY

In one aspect the present disclosure relates to a system readily configurable for use as either a step rail along a side of a motor vehicle, or also as a loading ramp for use in loading cargo into a cargo bed of the motor vehicle. The system may include a ramp assembly and a plurality of hangers. The hangers may each have a first end which is affixed to a portion of the vehicle, and a second end on which the ramp assembly may releasably be supported from and secured to. A striker post is fixedly secured to a first one of the hangers. At least one latching mechanism is carried on the ramp assembly for releasably engaging the striker post when the ramp assembly is positioned on the hangers, to thus secure the ramp assembly to the hangers in a first configuration for use as the step rail. A user engageable release element is provided for enabling releasing of the latching mechanism from the striker post. This enables the ramp assembly to be removed from the hangers and used as a ramp to aid in loading and unloading cargo items to and from a cargo area of the vehicle.

In another aspect the present disclosure relates to a system readily configurable for use as either a step rail along a side of a motor vehicle, or also as a loading ramp for use in loading cargo into a cargo bed of the motor vehicle. The system may include a ramp assembly and first and second hangers. The first and second hangers may be secured to a frame portion of the vehicle. Each of the first and second hangers has a first end which is affixed to a portion of the vehicle, and a second end on which the ramp assembly may releasably be supported from and secured to. First and second striker posts are fixedly secured to the first and second hangers, respectively. First and second latching mechanisms are carried on the ramp assembly adjacent opposite ends of the ramp assembly. The latching mechanisms releasably engage the first and second striker posts when the ramp assembly is positioned on the first and second hangers. This secures the ramp assembly to the first and second hangers in a first configuration for use as the step rail. A user engageable release element is also provided along with a coupling system. The coupling system couples the release element to each of the first and second locking mechanisms. The release element is configured to simultaneously unlatch the first and second latching mechanisms from the first and second striker posts when a user actuates the release element, to thus enable the ramp assembly to be removed from the first and second hangers.

In still another aspect the present disclosure relates to a system readily configurable for use as either a step rail along a side of a motor vehicle, or also as a loading ramp for use in loading cargo into a cargo bed of the motor vehicle. The system may include a ramp assembly and first and second hangers secured to a frame portion of the vehicle. Each of the first and second hangers has a first end which is affixed to a portion of the vehicle, and a second end on which the ramp assembly may releasably be supported from and secured to. First and second striker posts are fixedly secured to the first and second hangers, respectively. First and second latching mechanisms are carried on the ramp assembly adjacent opposite ends of the ramp assembly for releasably engaging the first and second striker posts when the ramp assembly is positioned on the first and second hangers. This enables securing of the ramp assembly to the first and second hangers in a first configuration for use as the step rail. A user engageable release element is also included. First and second lengths of cables are used for coupling the release element to each of the first and second locking mechanisms. The release element forms a handle configured to simultaneously unlatch the first and second latching mechanisms from the first and second striker posts when a user actuates the release element, to thus enable the ramp assembly to be removed from the first and second hangers. The release element is of dimensions enabling a user to handle and transport the ramp assembly with a single hand when the ramp assembly is detached from the first and second hangers.

BRIEF DESCRIPTION OF THE DRAWINGS

The drawings described herein are for illustration purposes only and are not intended to limit the scope of the present disclosure in any way.

FIG. 1 is a perspective view of a pickup truck incorporating a pair of stowable ramps in accordance with the present disclosure;

FIG. 2 is an enlarged perspective view of one of the ramps being supported within a pair of opposing support elements, wherein the support elements are fixedly secured to a frame portion of the pickup truck.

FIG. 3 is a perspective view one of the ramps being slid out from supports that themselves would be fixedly attached to a frame portion of the vehicle;

FIG. 4 is a plan view of one configuration of the ramps;

FIG. 5 is a rear view of the vehicle of FIG. 1 with the ramps in position being supported from the rear bumper of the vehicle;

FIG. 6 is a side view of the ramp system of FIG. 1 showing one end of one of the ramps engaged within a notch in an inside surface of the vehicle's tail gate while the tail gate is in the down (open) position;

FIG. 7 is a side view of another embodiment of the present disclosure in which the ramps have pivotally mounted end panels;

FIG. 8 is a perspective view of another embodiment of the present disclosure in which the ramps each have folding end panels that fold within cutout sections in a central portion of the ramp;

FIG. 9 is a perspective view of another embodiment of the present disclosure in which the entire ramp component is slid out from fixedly mounted rails;

FIG. 10 is an end view in accordance with line 10 in FIG. 9 showing a locking mechanism for locking one end of the ramp of FIG. 9 to its associated rail;

FIG. 11 is a perspective view of a step rail system in accordance with another embodiment of the present disclosure;

FIG. 14 is a perspective plan view of the grapple;

FIG. 15 is a perspective view of a lower surface of the grapple of FIG. 14;

FIG. 16 is a left side view of the grapple of FIG. 14;

FIG. 17 is a right side view of the grapple of FIG. 14;

FIG. 18 is an exploded perspective view of various components of the grapple release assembly;

FIG. 19 is a rear perspective view of the grapple release button;

FIG. 20A is a perspective view of a rear area of the housing of the grapple assembly;

FIG. 20B is a side view of the housing of FIG. 20A;

FIG. 21 is a side view of the rectangular member of the step assembly;

DETAILED DESCRIPTION

Figure 12:
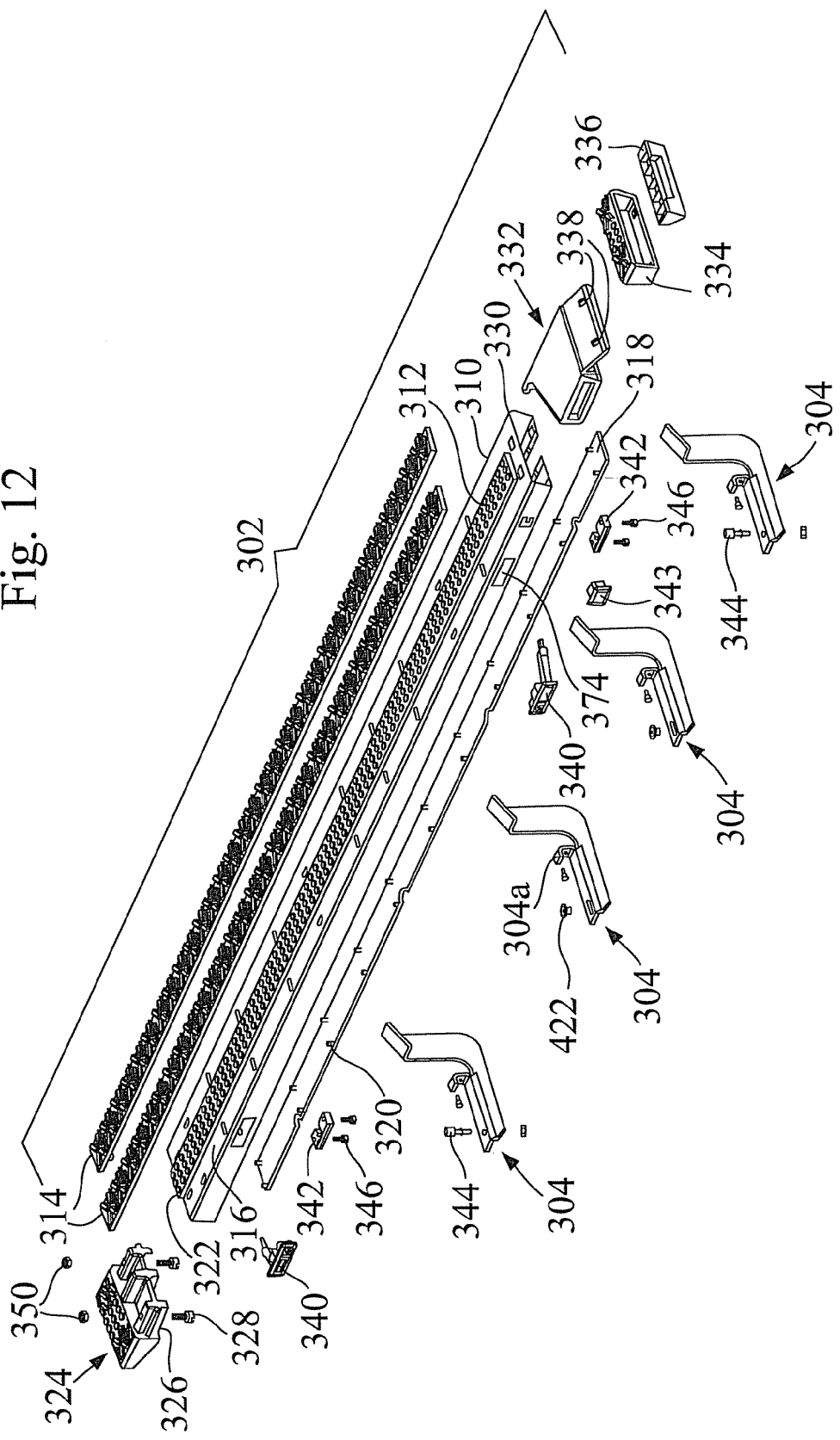
FIG. 12 is an exploded perspective view of the step assembly of FIG. 11.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a vehicle 12 including a stowable ramp system 10 in accordance with the present disclosure. It will be appreciated immediately that while the vehicle depicted is a pickup truck, the stowable ramp system 10 (hereinafter "system 10") could just as easily be used on a sport utility vehicle (SUV) a minivan, a commercial van or any other type of motor vehicle that has a compartment within which cargo can be carried. Accordingly, while the following references use of the system 10 with a pickup truck, the system 10 may potentially be implemented with a wide variety of other types of vehicles.

Referring further to FIGS. 1 and 2, the system 10 incorporates a slidable ramp 14 that may be supported from a pair of support elements 16 when in its stowed position. The support elements 16 may be secured to a frame member 18 of the vehicle 12 or any other suitable strong and rigid structure. The ramp 14 forms a step when in its stowed position. As such, storage of the ramp 14 is accomplished in a highly effective and useful manner. The ramp effectively forms double duty as a step to help a driver or passenger gain entry to the cab of the vehicle 12 when the ramp 14 is stowed, and as a ramp to enable larger items, especially wheeled items such as ATVs, motorcycles, riding or push behind lawn mowers, etc., to be easily loaded in the bed 20 of the vehicle 12.

Referring further to FIGS. 2 and 4, the ramps 14 may each have beveled corners 14*a* to help aid their insertion into the support elements 16 when they are being stowed. The ramps 14 may also have a grated or otherwise textured area 14*a* which helps to provide traction for the user as the user is entering or exiting the cab of the vehicle 12, as well as to provide traction when cargo is being wheeled up the ramps 14. FIG. 5 shows the ramps 14 positioned from a tailgate 22 of the vehicle 12.

FIG. 6 illustrates a side view of one of the ramps 14 being supported at one end from the tailgate 22 of the vehicle 12. The ramps 14 may have suitable structure, for example a projecting tab 24 or like component, that rests within a recess or opening 26 near the edge of the tailgate 22. Thus, to install the ramps 14 for use the user would simply align the projecting tab 24 with the recess or opening 26 and then lower that end of the ramp 14 to engage the projecting tab 24 in the recess or opening 26. The precise lengths of the ramps 14 may be selected to optimize their use as steps for aiding ingress and egress from the vehicle as well as well their use as loading/unloading ramps. It will be appreciated that increasing the lengths of the ramps will enable a less steep approach angle to be formed when the ramps, which should aid loading and unloading cargo (e.g., ATVs, motorcycles, etc.) from the bed area, but at the same time increase the overall weight of the ramps.

FIG. 7 shows ramps 14' in accordance with another configuration in which the ramps 14' have end panels 15' that are pivotally coupled via a pivot or hinge structure 17' with a central portion 19' of the ramp 14'. One of the end panels 15' may rest flat on an inner surface of the tailgate 22 while the other rests flat on the ground surface. One of the end panels 15' that is intended to be supported from the tailgate 22 may also include a projecting tab or similar structure (not shown), such as projecting tab 24, to positively connect it to the tailgate 22.

FIG. 8 shows a ramp 100 in accordance with another embodiment of the present disclosure. In this embodiment the ramp 100 has a central portion 102 and a folding end panel 104 at each end thereof. Each folding end panel is supported by a pivot bolt 106 which enables the end panels 104 to be folded within a complementary shaped cutout section 108 in the central portion 102. Alternatively, the folding end panels 104 could be slidably mounted in suitable rails such that they may be easily slid outwardly from the central portion 102 when required for use.

FIGS. 9 and 10 show a ramp system 200 in accordance with another embodiment of the present disclosure in which a ramp component 201 may be slid out from rails 202 mounted to a suitable frame portion of the vehicle 12. The ramp component 201 may include suitable rail-engaging components 204 (FIG. 10) which slidably engage the rails 202. Each rail component 204 may include a suitable locking element 206, which may be a spring loaded tab or other like component which engages within a cutout 208 (FIG. 9) in its respective rail 202. In this manner as the user slides the ramp component 201 onto the rails 202, the locking elements 206 automatically latch in their respective cutouts 208. Releasing the ramp component 201 may involve the user manually pressing on a spring loaded release component 210 (FIG. 10) at each end of the ramp component 201, and then sliding the ramp component out from the rails 202.

Referring to FIGS. 11 and 12, there is shown a step rail system 300 in accordance with another embodiment of the present disclosure. In FIG. 11 the system 300 is shown configured for use as a step rail to assist a user in stepping into and out from a motor vehicle, for example a pickup truck, SUV, van, etc. The system 300 in this example includes a step assembly 302 and a plurality of support elements 304. The support elements 304 have a first end 306 which may be fixedly attached such as by threaded bolts to a frame portion of a vehicle. A second end 308 of each support element 304 is used to support the step assembly 302 thereon. In one configuration the support elements 304 each have a generally L-shaped configuration, as best seen in FIG. 12, with a hook portion 304*a*. However, any suitable shape may be used provided it enables the support element 304 to be secured to the frame portion of the vehicle and to act as a support for the step assembly 302.

With reference to FIG. 12, the step assembly 302 includes an elongated, rectangular element 310 having a corrugated or stippled metal section 312 along a midpoint thereof. Rubber or elastomer pads 314 are secured to the rectangular element 310 using openings 316 formed on the rectangular element. A metal or plastic panel 318 may be used to close off the opening in the rectangular element 310 via conventional threaded fasteners 320.

A first end 322 of the rectangular element 310 may be closed off by a ramp fitting 324 configured with a neck portion 326 which fits snuggly into the rectangular element 310. The ramp fitting 324 may be secured to the rectangular element 310 using conventional threaded fasteners 328.

A second end 330 of the rectangular element 310 may have a telescopically extendable grapple 332 secured for sliding telescopic movement relative to the rectangular element 310. This enables the second end 330 of the step assembly 302 to be positioned on an edge of a cargo area when the step assembly 302 is being used as a ramp to load or unload cargo from the vehicle cargo area. A rubber, elastomer or like grapple cover 334 may be positioned over the grapple 332, and a grapple cap 336 secured to the openings 338 in the grapple and conventional threaded fasteners (the fasteners not being shown in FIG. 12), or by simply being snapped in place with suitable conventional fasteners.

The step assembly 302 also includes at least one, but preferably a pair, of latching assemblies 340. The latching assemblies 340 cooperate with latch plates 342 and strikers 344 to permit the step assembly 302 to be detachably secured to the support elements 304, and then released from the support elements by grasping the latching assemblies and rotating them outwardly into unlatched positions. The strikers 344 are secured to the rectangular element 310 by a plurality of conventional threaded fasteners 346. Grapple release button 343 forms a part of a grapple latching system 387 (FIG. 18) and allows the grapple 332 to be released and telescopically extended from the rectangular element 310 when the step assembly 302 is to be used as a ramp, as well as retained in a telescopically retracted position within the rectangular element 310 when the step assembly 302 is being used as a step platform.

When the latching assemblies 340 are each in their unlatched positions, the entire step assembly 302 may be removed from the support elements 304. When in their latched orientations, the latching assemblies 340 engage with the strikers 344 to prevent the step assembly 302 from being removed from the support elements 304. This important feature will be described further in the following paragraphs.

Figure 13:
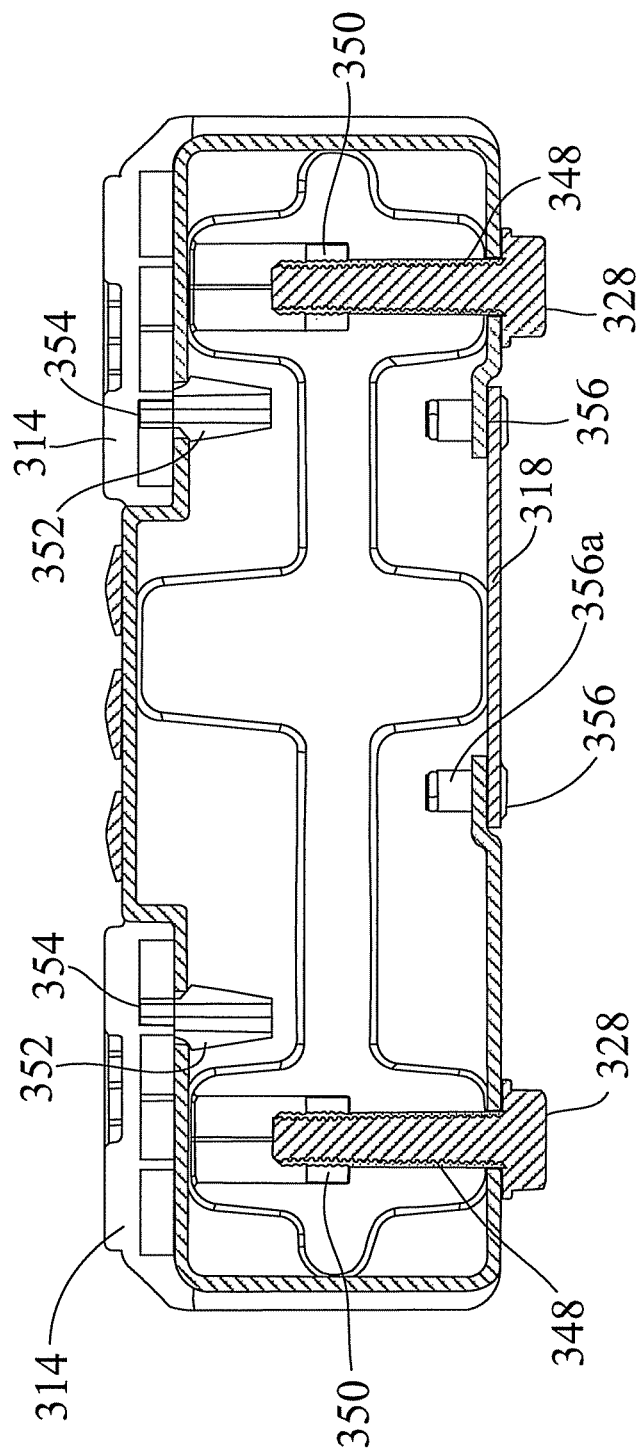
FIG. 13 is a cross sectional end view taken in accordance with section line 13-13 in FIG. 11 showing the attachment of the ramp fitting to a rectangular element of the step assembly.

Referring briefly to FIG. 13, the ramp fitting 324 can be seen secured to the rectangular element 310 by threaded fasteners 328 which extend into holes 348 in the ramp fitting and engage with threaded nuts 350. Rubber or elastomer pads 314 may be secured to the rectangular element 310 by compressible fastener portions 352 which are press fit into holes 354 in an upper surface of the rectangular element 310. Panel 318 is secured via RIVNUT® fasteners 356 and corresponding threaded screws 356a.

Referring to FIGS. 14-17, the grapple 332 is shown in greater detail. The grapple 332 includes an angled end portion 358 having the holes 338. A first slot 360 is formed on a first sidewall 362 (FIGS. 15 and 16), and a second slot 364 is formed on a second wall 366 (FIG. 17). An inner wall portion 370 (FIG. 15) also includes a slot 372. Slot 364 is dimensioned to receive the grapple release button 343, which also extends through a similarly shaped opening 374 (FIG. 12) in the rectangular element 310.

With reference to FIGS. 18 and 19, the grapple release button 343 is positioned within a housing 378 and biased outwardly by a pair of springs 380 (FIG. 18). In FIG. 19, the grapple release button 343 can be seen to include a pair of bores 382 which receive portions of the springs 380, and a blind center tapped bore 384 which receives a threaded shoulder bolt 386 that rides within the slot 364.

FIGS. 20A and 20B show the housing 378 having a pair of flexible arm portions 388 and a center opening 390. The threaded shoulder bolt 386 is positioned through the center opening 390 before being threadably secured to the grapple release button 343. With brief reference to FIG. 18, a head portion 386a of the shoulder bolt 386 engages within the slot 364 when the grapple release button 343 is assembled into the housing 378. The springs 380 serve to bias the grapple release button 343 outwardly and hold the head portion 386a of the shoulder bolt retracted against a backside 378a of the housing 378. The flexible arm portions 388 enable the housing 378 to be push fit into the opening 374 (FIG. 12) in the rectangular element 310 and retained therein after assembling the shoulder bolt 386 and grapple release button 343 thereto. Together, the grapple release button 343, springs 380, housing 378 and shoulder bolt 386 form the grapple latching system 387.

When the grapple release button 343 is not being depressed, the head portion 386a of the shoulder bolt 386 rests within the slot 364 and prevents the grapple 332 from being extended out from the rectangular element 310. When the user pushes the grapple release button 343 in, this causes the head portion 386a to be moved inwardly towards a longitudinal centerline of the rectangular element 310 and out the slot 364. While the grapple release button 343 is held in this position, the entire grapple 332 may be slid telescopically out from the rectangular element 310 a short distance defined by the longitudinal length of slot 364. Slot 360 engages the hook portion 304a of an outermost one of the support elements 304 to prevent the inward longitudinal side of the step assembly 302 from being lifted off of the support elements. Similarly, the hook portions 304a of the other support elements 304 engage slots 310a along a rear surface of the rectangular element 310, as shown in FIG. 21, which prevents the entire rear edge of the step assembly 302 from being lifted off the support elements 304.

Figure 22:
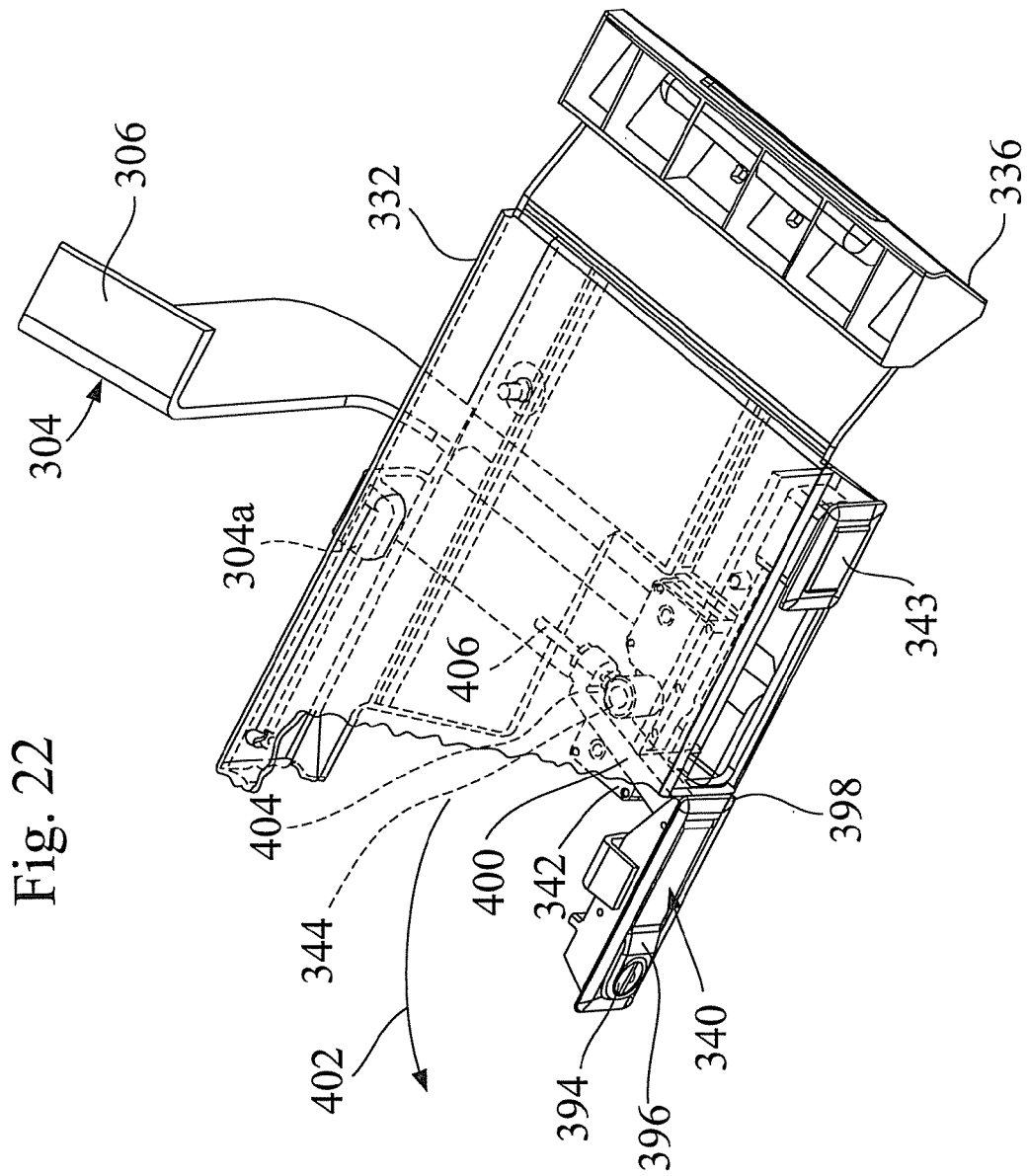
FIG. 22 is a cutaway perspective view of the grapple and the latching assembly showing the latching assembly latched to the striker associated with one of the support elements.
Figure 23:
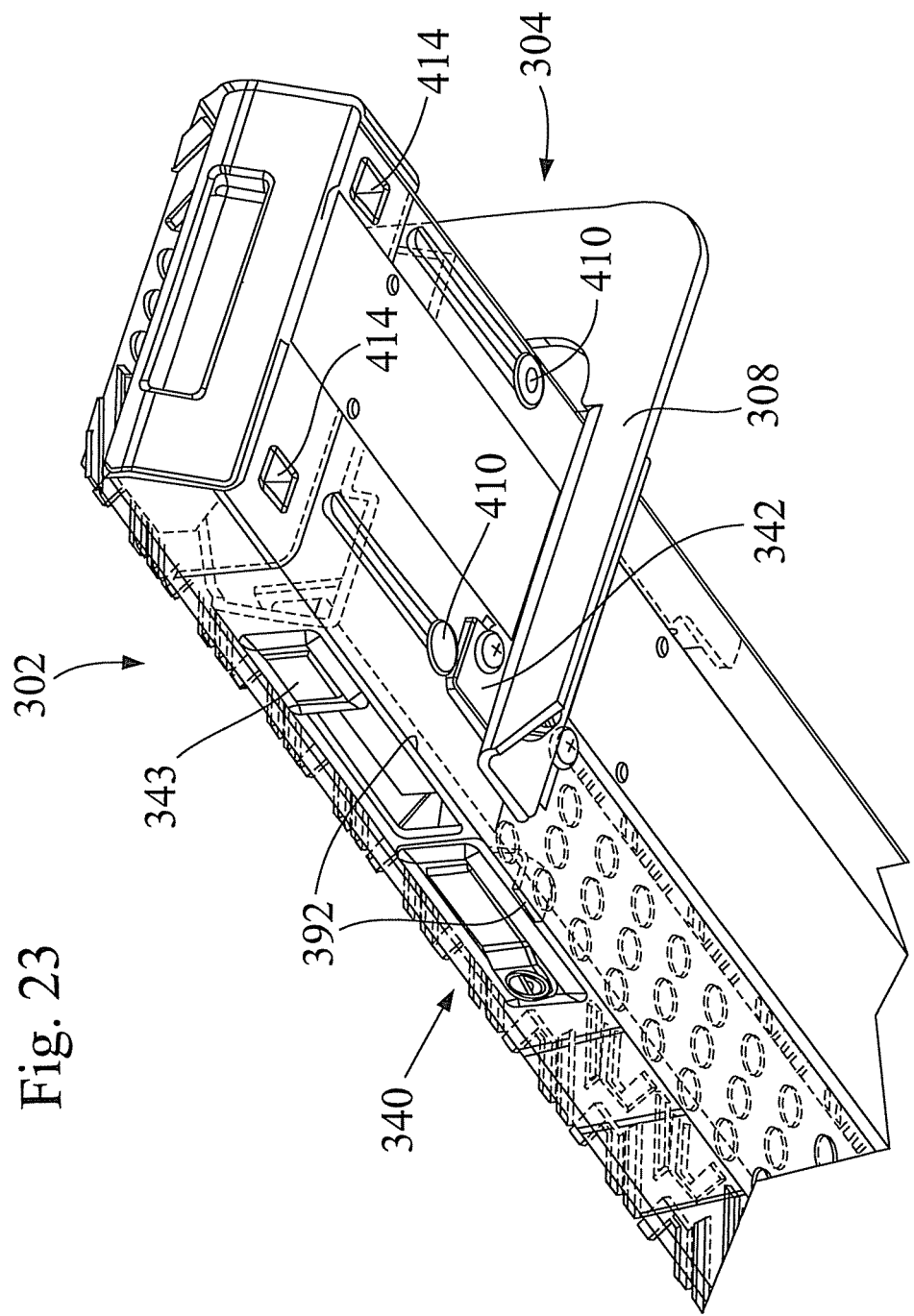
FIG. 23 is a perspective view of a lower surface of the step assembly showing the step assembly being supported by one of the support elements.
Figure 24:
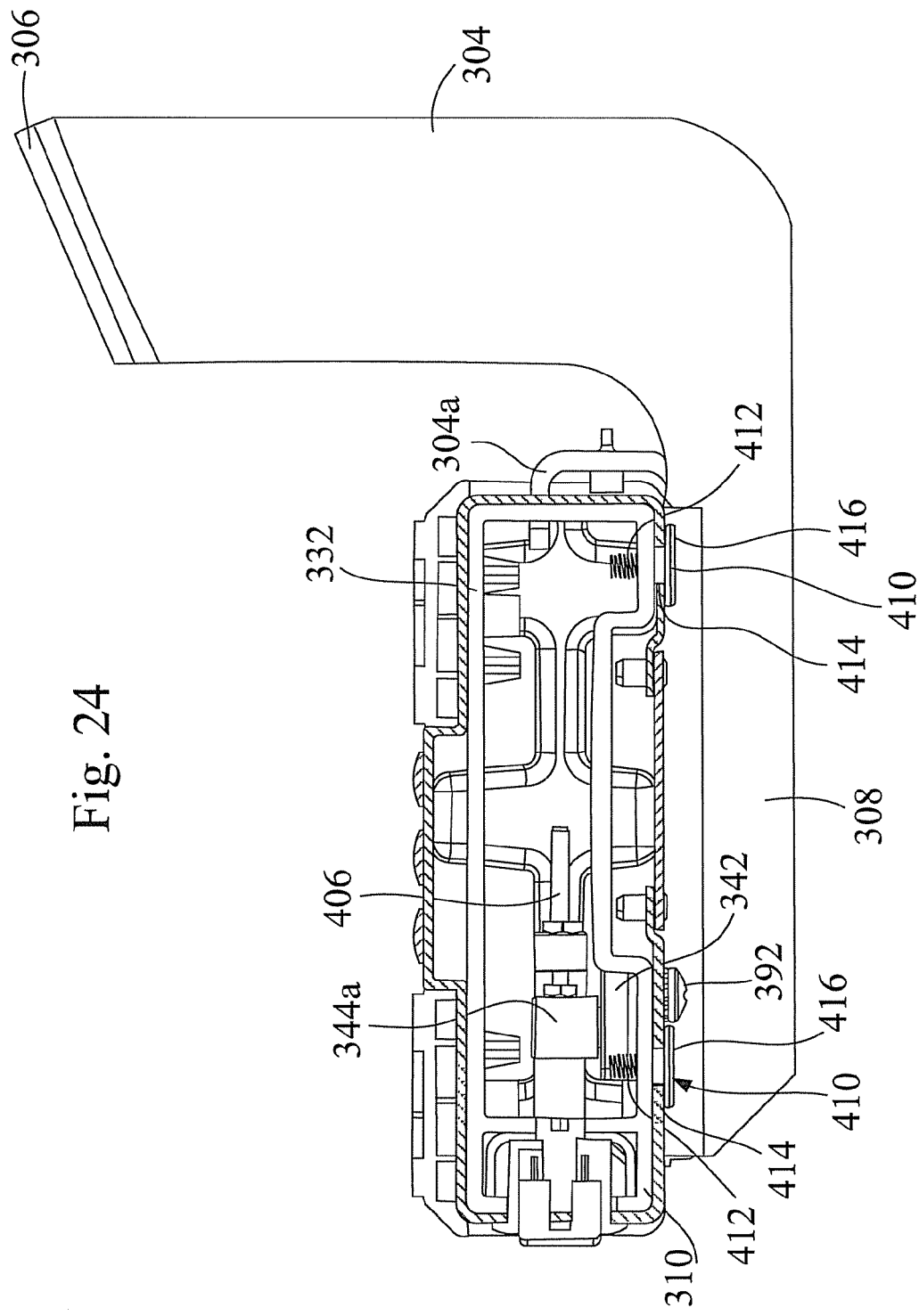
FIG. 24 is a cross sectional end view taken in accordance with section line 24-24 in FIG. 11 showing the latching assembly engaged with the striker, thus securing the step assembly to the support element.

Referring to FIGS. 22-24, one of the latching assemblies 340 can be seen engaged with one of the strikers 344 (FIGS. 22 and 24). The latch plate 342 is secured via a plurality of threaded fasteners 392 to a lower surface of the rectangular element 310 (FIG. 23). As can be seen in FIG. 22, the latching assembly 340 includes a lock 394 which can be unlocked with a key (not shown). When unlocked, a latch body 396 may be pivoted outwardly about pivot pin 398. This causes an arm portion 400 to rotate in accordance with arrow 402 out from engagement with the striker 344. The arm portion 400 may include an elbow 404 with a threaded adjustment screw 406 that enables precise adjustment of the engagement with the striker 344 when the arm portion is moved back into its locked position as shown in FIG. 22. The latch body 396 can thus be moved easily by the user with just one or two fingers between the latched and unlatched positions.

Figure 25:
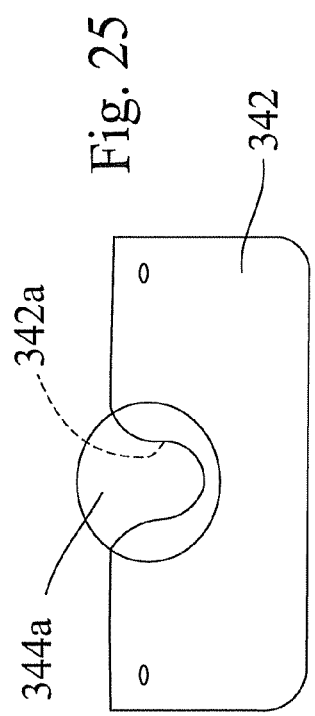
FIG. 25 is a plan view of the latch plate with the striker engaged in the opening in the latch plate, showing how the head portion of the striker is larger than the opening in the latch plate and thus prevents the step assembly from simply being lifted off of the support element when the latching assembly is in its latched orientation.

As shown in FIG. 24, when the latch body 396 is in the latched position, the arm portion 400 will be engaged with the striker 344. This prevents the step assembly 302 from simply being pulled outwardly along the support elements 304 away from the vehicle. It will also be noted in FIG. 25 that when the latch plate 342 is engaged with the striker 344, a head portion 344a of the striker 344 is larger in diameter than a key-like opening 342a in the latch plate 342. This prevents the step assembly 302 from simply being lifted upwardly off of the support element 304 when the latch body 396 is in the latched position relative to the striker 344. Thus, to remove the step assembly 302, the latch assemblies 340 both need to be moved into their unlatched positions, and then the opposite ends of the step assembly 302 may be slid away from the vehicle a short distance so that the hook portions 304a are clear of the step assembly and the strikers 344 are completely clear of the key-like openings 342a in the strikers 344. At that point the step assembly 302 may be lifted off of the support elements 304.

With brief reference to FIGS. 23 and 24, to further assist in enabling smooth sliding movement of the grapple 332, threaded fasteners 410 extend into threaded engagement with threaded holes 412 in a lower surface of the grapple 332, and through slots 414 in a lower surface of the rectangular element 310. Enlarged head portions 416 of each threaded fastener 410 thus help to prevent the grapple 332 from being completely detached from the rectangular member 310, while still permitting sliding movement of the grapple 332 between its extended and retracted positions.

Figure 26:
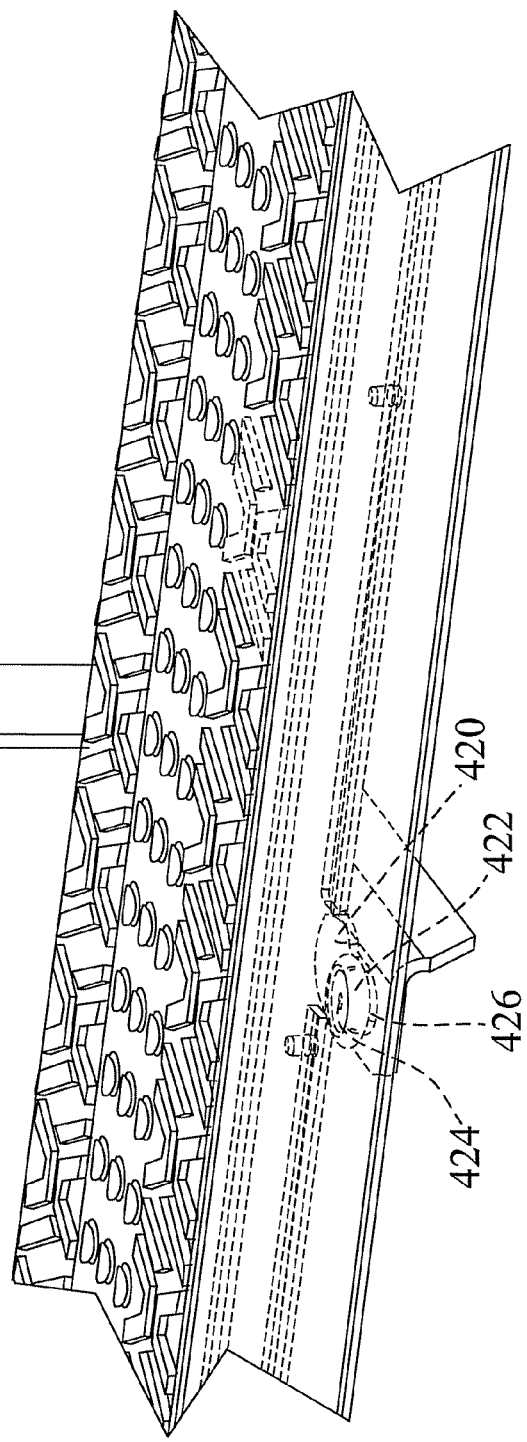
FIG. 26 is a cutaway perspective view showing one of the ring-like elements engaged within a key-like opening in a lower surface of the rectangular member of the step assembly, to thus help retain the step assembly to the support element.

With reference to FIG. 26, to further ensure that the step assemblies 302 do not vibrate or rattle when secured to the support elements 304, the rectangular element 310 may include enlarged, key-like openings 420 which are aligned with the longitudinal positions of the two centermost support elements 304. Each key-like opening 420 may be dimensioned to receive a rubber or elastomer ring-like element 422 which is secured to the second portion 308 of each of the centermost pair of support elements 304 via conventional threaded fasteners 424. A standoff or spacer 426 associated with each fastener 424 provides a small thickness just slightly greater than the cross sectional thickness of a lower surface of the rectangular element 310. Thus, to secure the step assembly 302 to the support elements 304, the step assembly may be positioned on the support elements so that the ring-like element 422 is received within the key-like opening 420. The step assembly 302 may then be pushed inwardly slightly toward the vehicle, wherein the ring-like element 422 will be captured in the smaller section of the key-like opening 420. The ring-like element 422 at each support element 304 has a small degree of compressibility which helps to wedge or clamp the step assembly 302 down onto the two centermost ones of the support elements 304.

Figure 27:
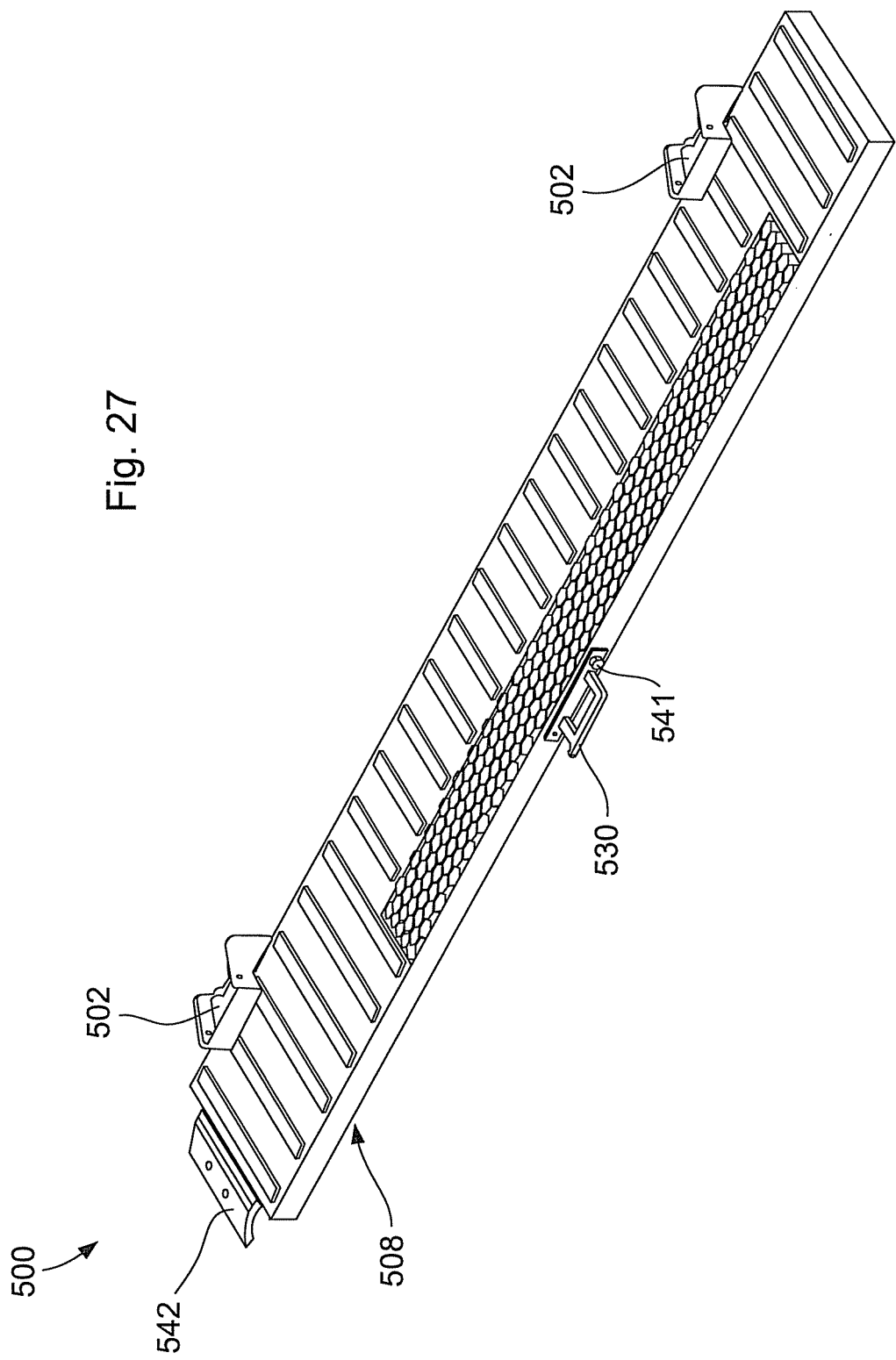
FIG. 27 is perspective view of a ramp assembly in accordance with another embodiment of the present disclosure.

Referring now to FIG. 27, a stowable ramp system 500 is shown in accordance with another embodiment of the present disclosure. The system 500 forms a combination loading ramp and step rail which can be configured as a ramp to aid in loading articles into the bed of a pickup truck, van, SUV or other like vehicle, or as a step rail that can be secured along the rocker panel area of the vehicle. When configured as a step rail, the system 500 functions as a secure step rail (i.e., step platform) for easing entry and egress to/from the vehicle cabin area.

Figure 28:
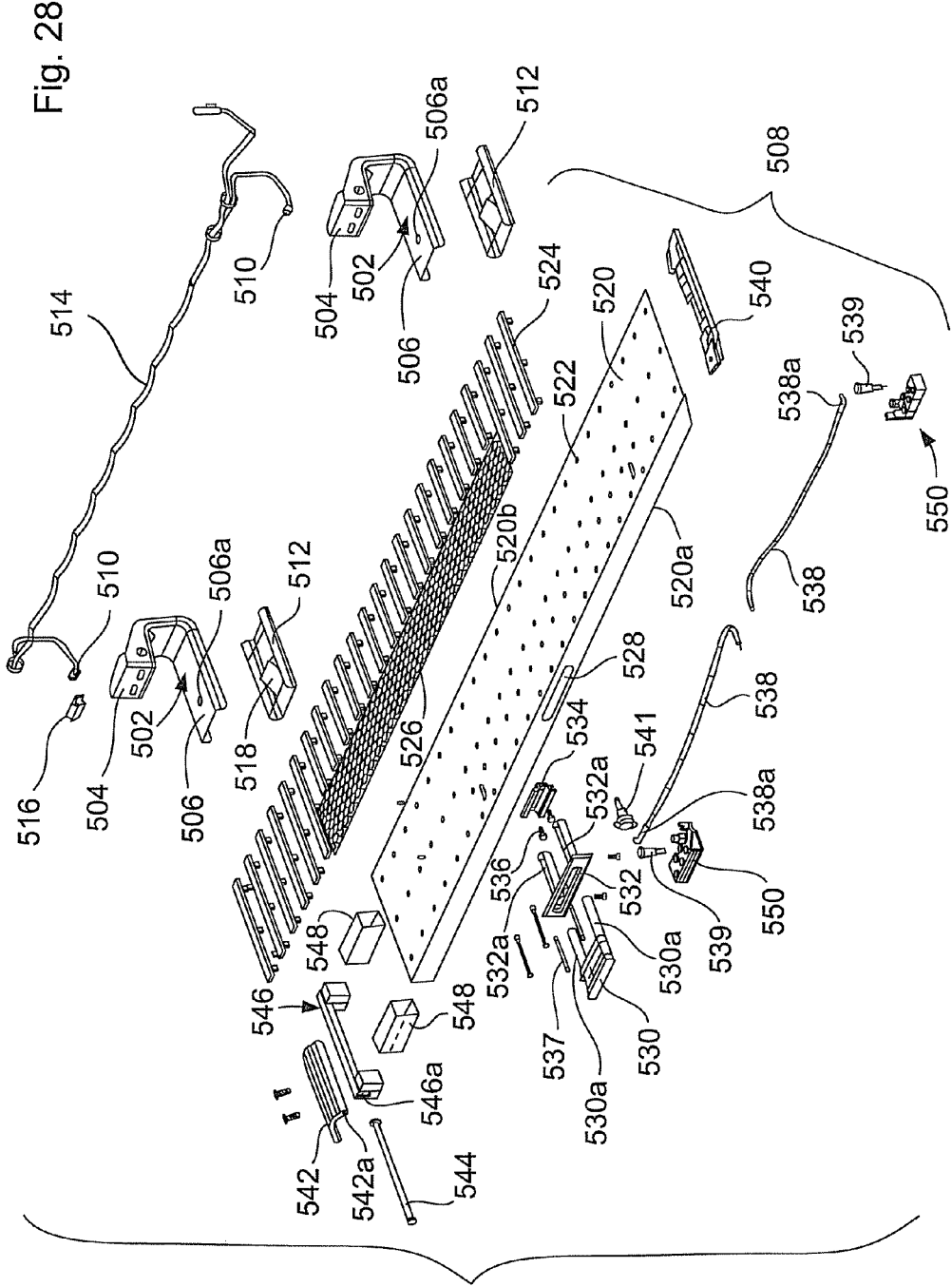
FIG. 28 is an exploded perspective view of a plurality of components that are used to form the ramp assembly, as well as a pair of hangers that are used to support the ramp assembly from a frame of the vehicle.

As shown in greater detail in FIG. 28, the system 500 makes use of a pair of hangers 502 having portions 504 which are secured to a portion of the vehicle body, and more preferably to the frame rails of the vehicle. Portions 506 are used to support a removable ramp assembly 508. Optionally, lights 510, which may be LEDs, may be positioned under portions 506 and secured therein using covers 512. The LEDs 510 may be connected to a suitable electrical cable 514 that may be connected to the vehicle's wiring harness to supply DC power to the LEDs 510. A translucent plastic lens element 516 may be secured using conventional tabs or otherwise within a pocket 518 in each of the hangers 502.

The ramp assembly 508 may be comprised of a metal (e.g., aluminum) frame 520 having a generally C-shape when viewed in cross section. The frame 520 may have a plurality of openings 522 into which rubber, plastic or even metallic tread pads 524 of the same shape or of different shapes may be press fit. In this example a rubberized pad 526 is also press fit into various ones of the openings. The rubberized pad 526 and the tread pads 524 aid in providing significant traction when an individual steps onto the ramp assembly 508 and when the ramp assembly is being used to load a wheeled vehicle into the bed of the vehicle.

The frame 520 also includes an opening 528 into which a release element 530 is disposed. The release element 530 includes hollow arm portions 530a which slide within hollow sections 532a of a guide member 532 mounted in the opening 528. The guide member 532 is secured in the opening 528 using a bracket 534 and threaded elements 536. Coil springs 537 are disposed in the hollow sections 532a and serve to provide tension to the ends of cable lengths 538 to help hold them taut. The function the cable lengths 538 will be described in the following paragraphs. Pulling the release element 530 outwardly away from the frame 520 serves to release the ramp assembly from the hangers 502. Striker posts 539 are threadably affixed in threaded holes 506a of portions 506 of the hangers 502. The striker posts 539 provide rigid elements for securing the ramp assembly 508 to the hangers 502, as will also be described more fully in the following paragraphs. An optional locking assembly 541 (e.g., keyed lock assembly) may be integrated into the frame 520 to prevent withdrawal of the release element 530, which would prevent the ramp assembly 508 from being removed from the hangers 502 without first unlocking the locking assembly 541 with a key.

With further reference to FIG. 28, an end cap 540 is secured to one end of the frame 520 via conventional threaded fasteners. The end cap 540 has an angled configuration which allows surface 540a to rest generally flush on a ground surface when the ramp assembly 508 is being used to load cargo items in the bed of the vehicle. At the opposite end of the frame 520 a pivoting grapple element 542 is pivotally mounted to the frame 520. The grapple element 542 is pivotally mounted using a pivot pin 544 which extends through a bore 542a in the grapple element and through a bore 546a in a plastic or metallic mounting block 546. The plastic or metallic mounting block includes portions 546b which are received in reinforcing tubes 548, which are in turn secured within the frame 520.

Figure 31:
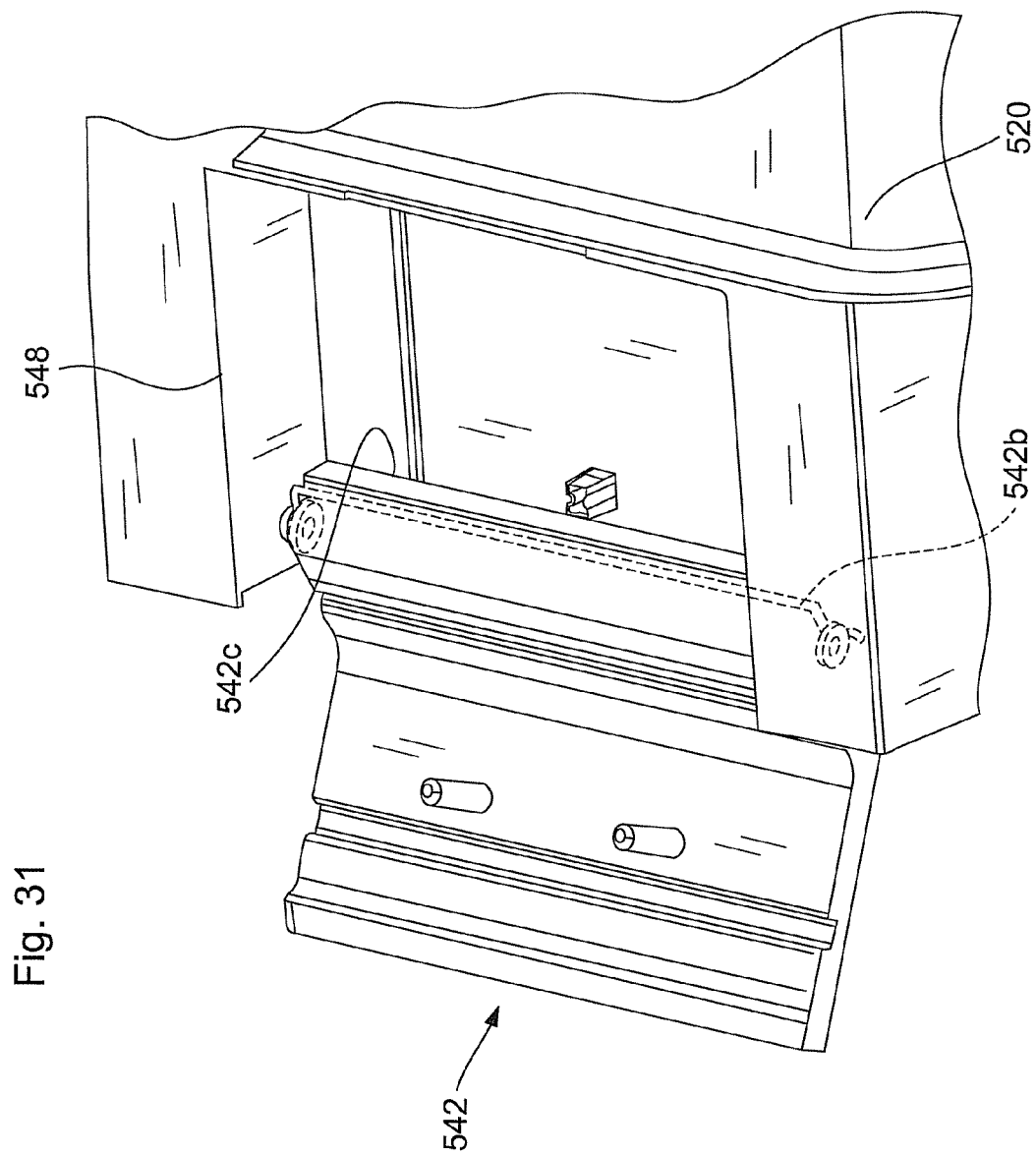
FIG. 31 is a perspective view of the grapple element and the torsion spring which enables it to be pivotally extended out from the frame of the ramp assembly.

With brief reference to FIG. 31, the grapple element 542 may optionally be biased into a normally retracted position by the use of a conventional torsion spring 542b positioned over the pivot pin 544 and engaging a lip 542c of the grapple element. Optionally, a user engageable, movable, pin-like, spring-biased release element (not shown) could be configured to hold the grapple element 542 in its retracted position when the ramp assembly 508 is being used as a step rail on the vehicle. When the ramp assembly 508 is to be used to load cargo items into the bed of the vehicle, the grapple element 542 forms a bracket-like component that rests on the edge of the liftgate of the vehicle and provides a transition surface over which a cargo item can easily be slid or rolled.

With further reference to FIG. 28, distal ends 538a of the cable lengths 538 are each connected to conventional latching mechanisms 550. The latching mechanisms 550 are shown in greater detail in FIGS. 29 and 30, and are identical in construction. The latching mechanisms 550 are secured to an undersurface 520a of the frame 520 by conventional threaded elements (not shown) or otherwise, and are positioned so that they are aligned with the striker posts 539. In this manner when the user a positions rearward edge 520b of the frame 520 on the hangers 502 and then slides the rearward edge toward the striker posts 539, the latching mechanisms 550 will be able to engage striker posts 539. The latching mechanisms are commercially available and include spring biased latching pawls 552 which are each controlled using one of the cable lengths 538. For example, in FIGS. 29 and 30 the illustrated latching mechanism 550 would be the latching mechanism 550 disposed at the left end of the frame 520 in FIG. 27. When the release element 530 shown in FIG. 27 is pulled outwardly, this causes cable length 538 to be pulled to the right, as indicated by arrow "A" in FIG. 29. This in turn causes rotation of a pivotally supported pawl 556, which in turn causes counter-clockwise rotation of a dog-leg shaped element 558 about a pivot pin 560. An additional torsion spring (not visible) associated with the dog-leg element 562, which biases the dog-leg shaped element clockwise in FIGS. 29 and 30, has its force overcome as the cable length 538 is pulled to the right, thus causing counter-clockwise rotation of the dog-leg shaped element 558. As such, whenever a pulling force is exerted using the release element 530, the dog-leg element 562 will be rotated out of engagement with the latching pawls 552 and the latching pawls will then be urged by the torsion springs 562 into their opened positions as shown in FIG. 29.

Figure 29:
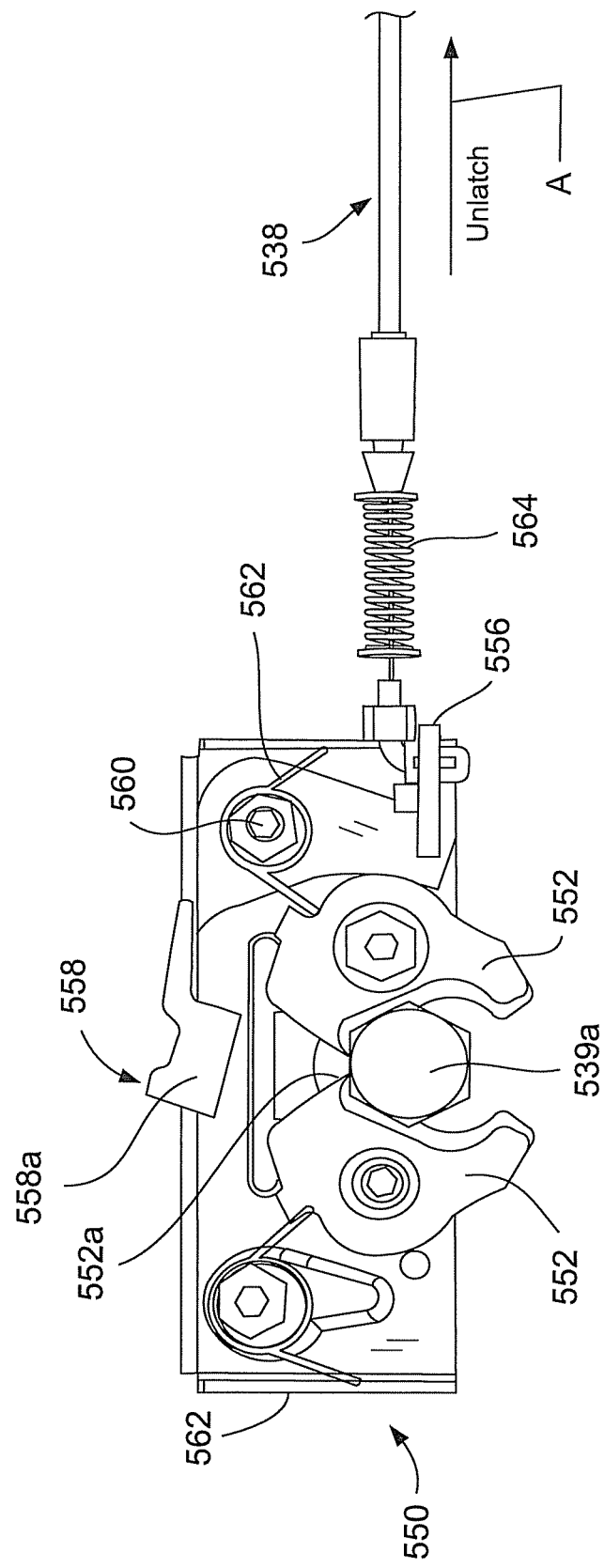
FIG. 29 is an enlarged, plan view of one of the pair of latching mechanisms used by the system of FIG. 27, and showing the latching mechanism in its normally unlatched orientation.
Figure 30:
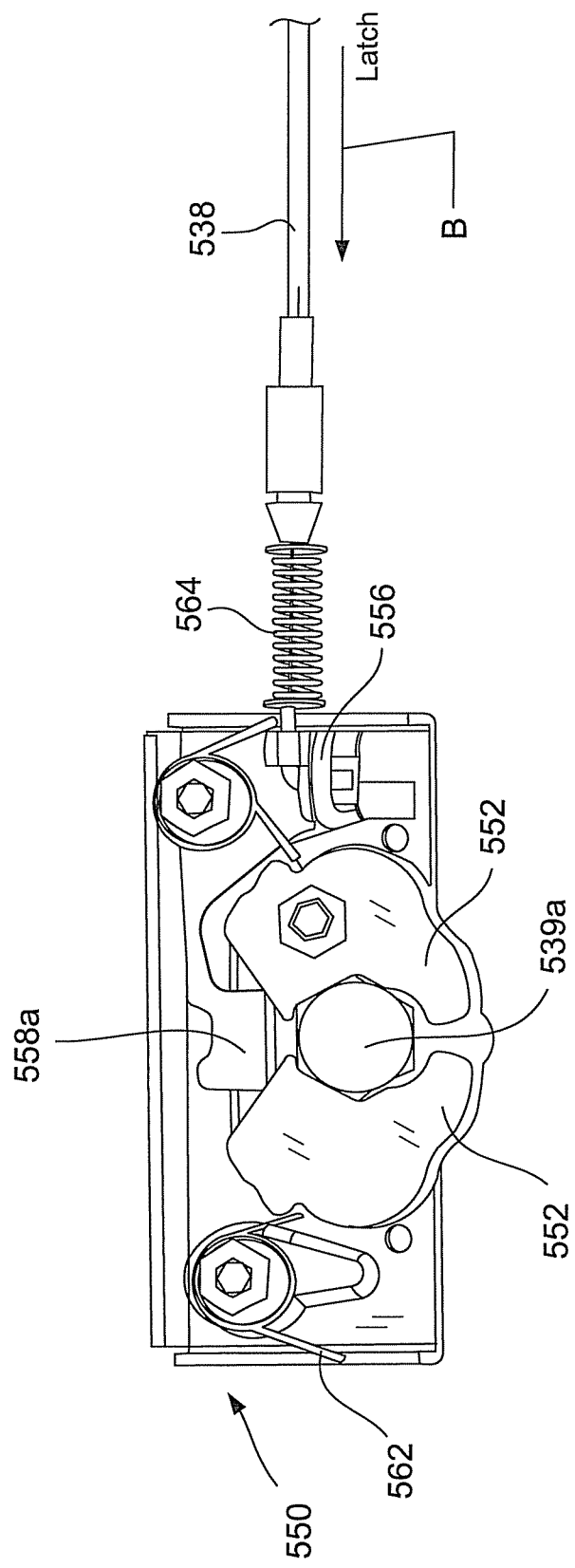
FIG. 30 is a perspective view of the latching mechanism of FIG. 29 but showing the mechanism in its latched orientation relative to the striker post.

When the release element 530 is released by the user, the torsion spring associated with the dog-leg shaped element 558 causes it to be rotated counter-clockwise in the drawings of FIGS. 29 and 30, and the cable length 538 will be urged in accordance with directional arrow B in FIG. 30. A head portion 558a engages surfaces 552a of each latching pawl 552 to urge them simultaneously into a closed orientation on the striker post head 539a, as shown in FIG. 30. Spring 564 helps to take up slack in the cable length 538 to maintain it taut. Thus, pulling on the release element 530 works to simultaneously unlatch and latch the latching mechanisms 550 at the opposite ends of the frame 520.

The user reinstalls the ramp assembly 508 by positioning a rearward edge of the frame 520 onto the hangers 502. At this point the user will typically be carrying the ramp assembly 508 by the release element 530, which forms a convenient handle which can be fully grasped with one hand. A particular advantage of the release element 530, then, is that it allows the ramp assembly 508 be transported using a single hand if needed.

When the user positions the ramp assembly 508 on the hangers 502 and pushes the ramp assembly fully onto the hangers 502 while maintaining a slight pulling force on the release element 530, the latching mechanisms 550 will be held in their unlatched orientations and will engage the striker posts 539. As the user releases the handle element 530, the torsion springs associated with the dog-leg shaped elements 558 urge the latching pawls 552 back into latched positions on their respective striker posts 539. The entire ramp assembly 508 will then be held securely on the hangers 502 and conveniently useable as a step rail assembly.

The handle element 530 also serves as a convenient means for the user to handle and carry the ramp assembly 508 using a single hand. The ramp assembly 508 is sufficiently light in weight so that a single person can easily handle removal, repositioning it on the tailgate of the vehicle, and then reinstallation on the hangers 502. The ramp assembly 508 is especially well adapted to be used with a bed of a vehicle such as a pickup truck, van or SUV, but potentially could be used as a ramp to help move cargo up onto, or down from, a porch of a house, or possibly into the bed of a trailer.

The various embodiments of the present disclosure all enable a pair of ramp assemblies to also be used as step rails to aid in entry and egress into/from a vehicle cabin area, as well as cargo loading ramps to assist in loading cargo into or out from a cargo area of a vehicle. The various embodiments of the present disclosure do not add appreciable weight because they are used in place of traditional, fixed mounted vehicle step rails. The various embodiments of the present disclosure can be quickly and easily removed for use without any tools and without complicated release procedures. Since the disclosed embodiments are used as step platforms when they are being stowed, they do not consume any storage space in the bed of a pickup truck, which would be the case if the ramp assemblies were dedicated ramps. The various embodiments are all light in weight and may be handled easily by most individuals. When the need arises to remove the ramp assemblies from their positions as step platforms and use them as ramps, then they may be easily removed by a single individual and re-positioned on the tailgate of the vehicle as ramps for use in loading and unloading cargo from the bed of the pickup truck.

It will also be appreciated that while the various embodiments have been described in connection with a fixed support arrangement relative to the vehicle's frame, that the various embodiments could just as readily be incorporated with support rails that retract and extend from underneath the vehicle, as with many present day step rail systems used on pickup trucks. Such step rails typically extend when the vehicle's "unlock" door lock button on a key FOB is pressed, and typically retract when the door is locked. All of the embodiments discussed herein could be configured as automatically extending/retracting step rails.

It will also be appreciated that the various embodiments may be adapted for use with little or no modifications on vehicles besides pickup trucks, for example medium and large SUVs, vans, crossovers, etc., which would benefit from having a step rail that may also be used as a cargo loading/unloading ramp. With SUVs, however, which typically incorporate a liftgate instead of a tailgate, the ramps would need to be supported from the floor of the cargo area or structure adjacent the rear bumper.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system readily configurable for use as either a step rail along a side of a motor vehicle, or also as a loading ramp for use in loading cargo into a cargo bed of the motor vehicle, the system including:
    a ramp assembly;
    a plurality of hangers each having a first end which is affixed to a portion of the vehicle, and a second end on which the ramp assembly may releasably be supported from and secured to;
    a striker post fixedly secured to a first one of the hangers;
    at least one latching mechanism carried on the ramp assembly for releasably engaging the striker post when the ramp assembly is positioned on the hangers, to thus secure the ramp assembly to the hangers in a first configuration for use as the step rail;
    a user engageable release element for enabling releasing of the latching mechanism to enable the ramp assembly to be removed from the hangers and used as a ramp to aid in loading and unloading cargo items to and from a cargo area of the vehicle;
    an additional latching mechanism included on the ramp assembly;
    a plurality of lengths of cable attaching the release element to the latching mechanism and the additional latching mechanism;
    an additional striker post secured to a second one of the hangers; and
    wherein actuation of the release element simultaneously releases both the latching mechanism and the additional latching mechanism from the striker post and the additional striker post.

2. The system of claim 1, wherein the ramp assembly further comprises:
    a frame; and
    a grapple element coupled to one end of the frame, the grapple able to be pivoted out from a retracted position in the one end to an extended position, to be useable to engage an edge surface of one of a tailgate or a cargo bed when being used as a loading ramp.

3. The system of claim 2, wherein the ramp assembly further comprises a torsion spring for urging the grapple element into the extended position; and
    wherein the grapple element is housed within the frame of the ramp assembly when in the retracted position.

4. The system of claim 3, wherein the user release element is configured to be engaged with a single hand of a user and pulled outwardly from a retracted position within the frame, to unlatch the ramp assembly from the hangers.

5. The system of claim 1, wherein the release element is movable linearly and forms a handle which is graspable with one hand of the a user.

6. The system of claim 1, The system of claim 5, wherein the latching mechanism further includes an elbow extending from an arm portion, and a threaded element extending through the elbow portion, the threaded element enabling a degree of adjustment of the engagement of the arm portion with the striker post.

7. The system of claim 1, further comprising a light secured to one of the hangers.

8. A system readily configurable for use as either a step rail along a side of a motor vehicle, or also as a loading ramp for use in loading cargo into a cargo bed of the motor vehicle, the system including:
   a ramp assembly including an elongated frame;
   first and second hangers secured to a vehicle frame portion of the vehicle, each of said first and second hangers having a first end which is affixed to a portion of the vehicle, and a second end on which the ramp assembly may releasably be supported from and secured to;
   first and second striker posts fixedly secured to the first and second hangers, respectively;
   first and second latching mechanisms carried on the ramp assembly adjacent opposite ends of the ramp assembly for releasably engaging the first and second striker posts when the ramp assembly is positioned on the first and second hangers, to thus secure the ramp assembly to the first and second hangers in a first configuration for use as the step rail; and
   a user engageable release element;
   a coupling system for coupling the release element to each of the first and second latching mechanisms; and
   the release element configured to simultaneously unlatch the first and second latching mechanisms from the first and second striker posts when a user actuates the release element, to thus enable the ramp assembly to be removed from the first and second hangers.

9. The system of claim 8, wherein the release element forms a handle that is graspable with one hand of a user.

10. The system of claim 8, wherein the release element is moveable linearly from a recessed position within the elongated frame to an extended position, when grasped and pulled on.

11. The system of claim 8, wherein the release element is located at an approximate midpoint of the elongated frame.

12. The system of claim 8, wherein the coupling system comprises first and second lengths of cable that are secured at first ends to the release element and at second ends to respective ones of the first and second latching mechanisms.

13. The system of claim 8, further comprising a grapple element secured to one end of the elongated frame.

14. The system of claim 13, wherein the grapple element is pivotally supported relative to the elongated frame and is retracted within the elongated frame when not in use.

15. The system of claim 13, further comprising a plurality of LEDs disposed in portions of the hangers for illuminating an area adjacent the vehicle.

16. A system readily configurable for use as either a step rail along a side of a motor vehicle, or also as a loading ramp for use in loading cargo into a cargo bed of the motor vehicle, the system including:
   a ramp assembly having an elongated frame;
   first and second hangers secured to a vehicle frame portion of the vehicle, each of said first and second hangers having a first end which is affixed to the vehicle frame portion of the vehicle, and a second end on which the ramp assembly may releasably be supported from and secured to;
   first and second striker posts fixedly secured to the first and second hangers, respectively;
   first and second latching mechanisms carried on the ramp assembly adjacent opposite ends of the ramp assembly for releasably engaging the first and second striker posts when the ramp assembly is positioned on the first and second hangers, to thus secure the ramp assembly to the first and second hangers in a first configuration for use as the step rail; and
   a user engageable release element disposed on the ramp assembly;
   first and second lengths of cables for coupling the release element to each of the first and second locking mechanisms;
   the release element forming a handle configured to simultaneously unlatch the first and second latching mechanisms from the first and second striker posts when a user actuates the release element, to thus enable the ramp assembly to be removed from the first and second hangers; and
   the release element being of dimensions enabling a user to handle and transport the ramp assembly with a single hand when the ramp assembly is detached from the first and second hangers.

17. The system of claim 16, wherein the release element is held in a recessed position with the elongated frame of the ramp assembly.

18. The system of claim 16, further comprising a grapple element pivotally secured relative to the elongated frame for assisting in positioning the ramp assembly on a tailgate or edge surface of a cargo area of a vehicle.

19. The system of claim 16, further comprising a plurality of lights positioned in the hangers for illuminating an area adjacent the vehicle.

* * * * *